US00RE42848E

(19) United States
(12) Reissued Patent
Sato et al.

(10) Patent Number: US RE42,848 E
(45) Date of Reissued Patent: Oct. 18, 2011

(54) INFORMATION TRANSMISSION SYSTEM USING LIGHT AS COMMUNICATION MEDIUM, INFORMATION TRANSMISSION METHOD, IMAGE PICKUP DEVICE, AND COMPUTER PROGRAMMED PRODUCT

(75) Inventors: Kunio Sato, Ome (JP); Nobuo Iizuka, Hamura (JP)

(73) Assignee: Casio Computer Co., Ltd., Tokyo (JP)

(21) Appl. No.: 11/895,260

(22) Filed: Aug. 23, 2007

Related U.S. Patent Documents

Reissue of:
(64) Patent No.: 6,933,956
Issued: Aug. 23, 2005
Appl. No.: 10/246,042
PCT Filed: Sep. 18, 2002

(30) Foreign Application Priority Data

Sep. 21, 2001 (JP) ..... 2001/288428
Aug. 12, 2002 (JP) ..... 2002/235225

(51) Int. Cl.
*G09G 5/10* (2006.01)
*H04N 5/232* (2006.01)

(52) U.S. Cl. ..... 345/690; 345/204; 348/211.2

(58) Field of Classification Search ..... 345/690
See application file for complete search history.

(56) References Cited

U.S. PATENT DOCUMENTS

| | | | | |
|---|---|---|---|---|
| 5,038,214 | A * | 8/1991 | Miida | 348/207.1 |
| 5,956,082 | A * | 9/1999 | Yamazaki | 348/222.1 |
| 6,208,378 | B1 * | 3/2001 | Barraclough et al. | 348/211.1 |
| 6,522,889 | B1 * | 2/2003 | Aarnio | 455/456.5 |
| 6,701,058 | B1 * | 3/2004 | Tsubaki | 386/226 |
| 6,798,445 | B1 * | 9/2004 | Brumitt et al. | 348/207.11 |
| 2003/0025803 | A1 * | 2/2003 | Nakamura et al. | 348/218.1 |
| 2004/0201717 | A1 * | 10/2004 | Matsushima | 348/222.1 |

* cited by examiner

*Primary Examiner* — Duc Q Dinh
(74) *Attorney, Agent, or Firm* — Holtz, Holtz, Goodman & Chick, P.C.

(57) ABSTRACT

A CPU 36 of a light emitting unit 30 fetches ith bit of transmission information TX stored in a transmission data memory 33 in synchronization with a clock signal CK from a timing generator 35. The CUP 36 determines the bit value and fetches a first pattern sequence SA from a pattern data memory 44 when the bit is logic signal 1, and fetches a second pattern sequence SB from a pattern data memory 34 when the bit is logic signal 0, and outputs the first pattern sequence SA and second pattern sequence SB to a light emitting section 37. While, a CPU 39 of a light receiving unit 40 extracts a pixel area with a time sequence luminance variation pattern from a frame image captured into a capture image buffer 46, and binarizes the luminance variation pattern, and performs logic determination. A liquid crystal display 44 displays information of a light emitting area to be overlapped with a subject image.

20 Claims, 35 Drawing Sheets

FIG.17A

| AREA CENTRAL COORDINATES | BIT BUFFER | | | | | | | | INFORMATION CHARACTER STRING | | | | | | | | | |
|---|---|---|---|---|---|---|---|---|---|---|---|---|---|---|---|---|---|---|
| (160, 119) | 0 | 0 | 1 | – | – | – | – | – | X | _ | T | o | w | e | r | | | |
| (20, 23) | 0 | 1 | 0 | 0 | 0 | | | | * | * | * | * | * | * | * | * | * | * |

FIG.17B

| AREA CENTRAL COORDINATES | BIT BUFFER | | | | | | | | INFORMATION CHARACTER STRING | | | | | | | | | |
|---|---|---|---|---|---|---|---|---|---|---|---|---|---|---|---|---|---|---|
| (159, 121) | 0 | 0 | 1 | 0 | – | – | – | – | X | _ | T | o | w | e | r | | | |
| (20, 24) | 0 | 1 | 0 | 0 | 0 | 0 | 0 | 1 | | | | | | | | | | |
| (300, 98) | 0 | – | – | – | – | – | – | – | | | | | | | | | | |

FIG.24

112

| NO. | PIXEL REDUCTION CONDITION | | FULL FIELD ANGLE IMAGE SIZE | THE NUMBER OF AREAS |
|---|---|---|---|---|
| | VERTICAL | HORIZONTAL | | |
| 1 | 4 | 4 | 320×240 | 1×1 |
| 2 | 4 | 2 | 640×240 | 3×1 |
| 3 | 2 | 2 | 640×480 | 3×3 |
| 4 | 2 | 1 | 1280×480 | 5×3 |
| 5 | 1 | 1 | 1280×960 | 5×5 |

INFORMATION TRANSMISSION SYSTEM USING LIGHT AS COMMUNICATION MEDIUM, INFORMATION TRANSMISSION METHOD, IMAGE PICKUP DEVICE, AND COMPUTER PROGRAMMED PRODUCT

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,933,956. The reissue applications are the present application and application Ser. No. 13/044,441, filed on Mar. 9, 2011, which is a Divisional Reissue Application of the present application.*

BACKGROUND OF THE INVENTION

1. Field of the Invention

The present invention relates to an information transmission system available for displaying the explanation of commodity products at the store, explanation of exhibit products at a museum, an exhibition, and for displaying landmarks and advertisements of building, etc., crowd state of amusement facilities such as an-amusement park, and relates to an information transmission method, an image pickup device, and a computer programmed product.

2. Description of the Related Art

Conventionally, display for information relating to commodity and exhibit products, display for landmarks and advertisements of building, etc., display for crowd state of amusement facilities such as an amusement park are carried out in the form of character information written on paper, hanging screen, signboard, plate, etc, (hereinafter referred to as "information presentation" for the sake of expediency).

However, such an information presentation using characters mainly has the following problems.

(1) In the case where the number of information presenting objects is large, the number of information presentations such as signboards, etc increases, resultantly, main object does not become conspicuous. Moreover, the relationship between the information presentation and the information presenting object cannot be easily understood. Erroneous understanding of information occurs in some cases. For example, there is a case in which information on goods A is misunderstood as information on goods B. (2) Character information written on the information presentation can be read by anyone who has normal eyesight. For this reason, in order to present limited information (for example, purchasing cost of goods, maximum reduction rate, etc.,) to only specific persons, it is necessary to take protection measures such as information coding, and so on. However, complicated information coding has to be simplified since the usability is bad, and this causes a possibility that the effect of information coding will be reduced and that such information will be easily read.

SUMMARY OF THE INVENTION

It is an object of the present invention is to provide an information transmission system that prevents adverse effects caused by disturbance light in information transmission using light as a communication medium to make it possible to perform transmission and reproduction of accurate information at all times, and an information transmission method, and an image pickup device.

An information transmission system of the present invention comprising a light emitting unit that converts arbitrary information into an optical signal to output and a light receiving unit that receives the optical signal to reproduce the information, the light emitting unit including: determining means for logically determining a bit sequence that structures the arbitrary information; selecting means for selecting a specific bit pattern sequence from two bit pattern sequences having a low correlation with each other, pre-prepared based on the determination result by the determining means; modulating means for modulating the arbitrary information to light intensity according to the selection result by the selecting means; an output controlling means for performing control to output the optical signal with intensity modulated by the modulating means; the light receiving unit including: binarizing means for receiving the optical signal output from the light emitting unit to binarize according to the light intensity; bit pattern determining means for determining whether or not the bit pattern sequence included in the signal binarized by the binarizing means corresponds to any one of said pre-prepared two bit pattern sequences having a low correlation with each other; signal outputting means for outputting a logic signal corresponding to the bit pattern sequence determined by the bit pattern determining means; and reproducing means for reproducing the arbitrary information based on the output result from the signal outputting means.

Moreover, an information transmission method of the present invention that converts information to be transmitted into an optical signal to output by a light emitting unit and that receives the optical signal by a light receiving unit to reproduce the information, the method comprising the steps of: logically determining a bit sequence that structures information to be transmitted; selecting a bit pattern sequence alternatively from two bit pattern sequences having a low correlation with each other, pre-prepared according to the result determined in the logic determining step; outputting the optical signal with intensity modulated according to the result selected in the selecting step; binarizing the optical signal received according to intensity; determining whether or not the bit pattern sequence included in the result binarized in the binarizing step corresponds to any one of said two bit pattern sequences having a low correlation with each other, pre-prepared; generating a corresponding logic signal when the bit pattern sequence corresponds to any one of said two bit pattern sequences is determined in the determining step; and reproducing the information based on the logic signal generated in the generating step.

Furthermore, an image pickup device of the present invention comprising: image pickup means; storage means for storing two bit pattern sequences having a low correlation with each other; scanning means for scanning an area subjected to image pickup by the image pickup means; means for specifying an output light area subjected to intensity modulation based on the result scanned by the scanning means; binarizing means for binarizing the output light area specified by the means according to light intensity; bit pattern determining means for determining whether or not the bit pattern sequence included in the signal binarized by the binarizing means corresponds to any one of said two bit pattern sequences having a low correlation with each other, stored in the storage means; signal outputting means for outputting a logic-signal corresponding to the bit pattern sequence determined by the bit pattern determining means; and reproducing means for reproducing information based on the output result from the signal outputting means.

Still furthermore, a computer programmed product having a computer-program recorded on storage computer-readable storage medium, the computer-program causing a computer, being connected to an image pickup device, to execute steps of: scanning an area subjected to image pickup by the image pickup device; specifying an output light area subjected to intensity modulation based on the scanned result; binarizing the specified output light area according to light intensity; determining whether or not a bit pattern sequence included in the signal binarized by the binarizing means corresponds to any one of pre-prepared two bit pattern sequences having a low correlation with each other; outputting a logic signal corresponding to the determined bit pattern sequence; and outputting information based on the output result in the signal outputting step.

BRIEF DESCRIPTION OF THE DRAWINGS

These objects and other objects and advantages of the present invention will become more apparent upon reading of the following detailed description and the accompanying drawings in which:

FIGS. 17A and 17B are views showing one example of a state of a data list memory 55 after the list update processing program is executed;

FIG. 24 is a conceptual view showing storage data stored in a reading condition list memory 112;

DETAILED DESCRIPTION OF THE PREFERRED EMBODIMENTS

The following specifically explain the embodiments of the present invention with reference to the drawings attached herewith.

First, the information transmission system-according to this embodiment has a basic configuration in which a light emitting unit and a light receiving unit are combined. The light emitting units are attached to information presenting objects such as commodity products, landmarks including buildings, signboards for advertisement, and amusement facilities etc. While, the light-receiving units are carried by a person, who views these information presenting objects, (hereinafter referred to as "user"). The number of light emitting units corresponds to that of information presenting objects, and the number of light receiving units corresponds to that of users.

(Explanation of Concept)

Figure 1:
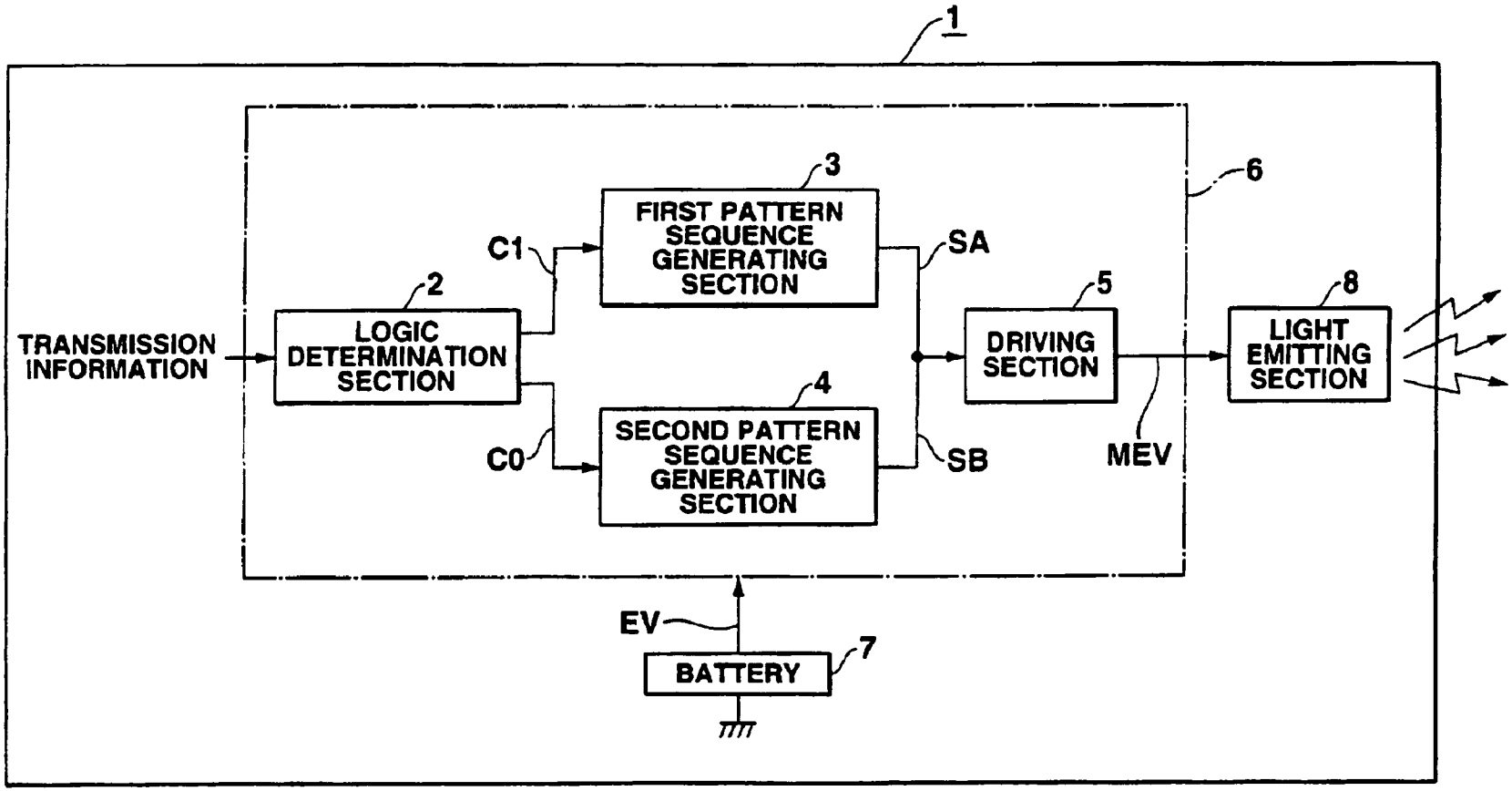
FIG. 1 is a conceptual structural view of a light emitting unit 1.

FIG. 1 is a conceptual structural view of a light emitting unit 1. The light emitting unit 1 is composed of a logical determining section 2, a first pattern sequence generating section 3, a second pattern sequence generating section 4, an electronic circuit section 6 including a driving section 5, a buttery 7 that supplies a DC power source EV to the electronic circuit section 6, and a light emitting section 8.

The logical determining section 2 fetches arbitrarily binarized transmission information TX, which is digitalized, and composed of logic signal 0 and logic signal 1, one bit by one. The logical determining section 2 determines each bit and outputs a pattern generating command C1 to the first pattern sequence generating section 3 when the logic signal 1, and a pattern generating command C0 to the second pattern sequence generating section 4 when the logic signal is 0.

The first pattern sequence generating section 3 and second pattern sequence generating section 4 respectively generate specific bit pattern sequences (first pattern sequence SA, second pattern sequence SB) having a low correlation with each other when a pattern generating command C0/C1 is output from the logical determining section 2.

The driving section 5 modulates DC voltage EV using the first and second pattern sequences (SA/SB) generated by the first pattern sequence generating section 3 and second pattern sequence generating section 4, and drives the light emitting section 8 at the modulation voltage MEV. The light emitting section 8 emits light P having a time-sequence luminance variation pattern in which light is turned on at modulation voltage MEV (ON interval), and light is turned off at substantially 0V (OFF interval).

Figure 2A:
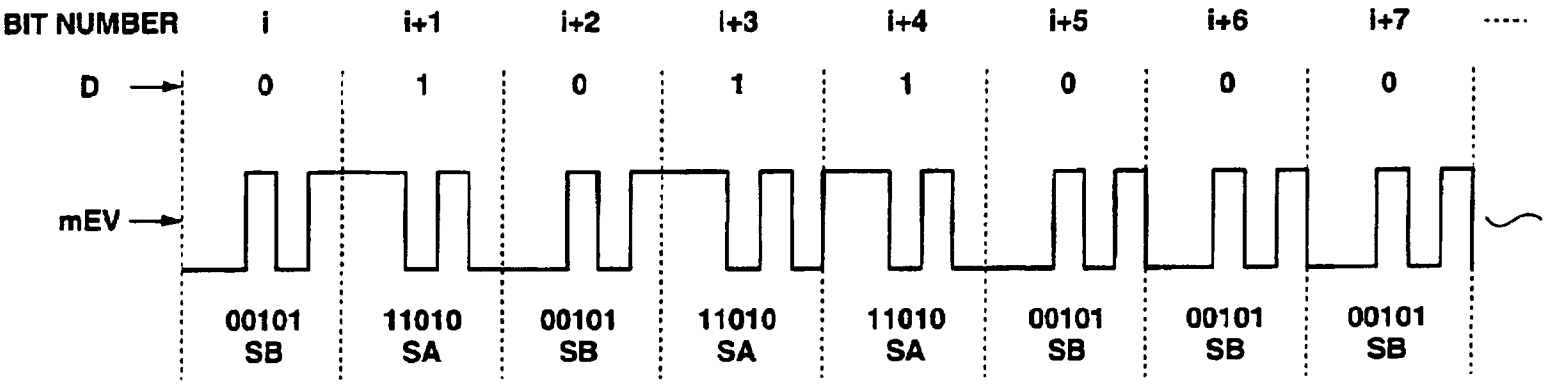
FIGS. 2A and 2B are views showing an example of a pattern sequence (SA/SB) and a structural view of the case when two pattern sequences (SA/SB) are produced concurrently.

FIG. 2A shows an example of first and second pattern sequences (SA/SB). In this figure, for example, if arbitrary transmission information TX is set to a bit sequence of "01011000 . . . ", the TX results in the following bits:

i bit=0
i+1 bit=1
i+2 bit=0
i+3 bit=1
i+4 bit=1
i+5 bit=0
i+6 bit=0
i+7 bit=0

Accordingly, the logic determining section 2 sequentially outputs C0 and C1 as shown in the following:

i bit=C0
i+1 bit=C1
i+2 bit=C0
i+3 bit=C1
i+4 bit=C1
i+5 bit=C0
i+6 bit=C0
i+7 bit=C0

Therefore, the first and second pattern generating sections 3 and 4 to which C1 and C0 are input generate the corresponding first pattern sequence SA and second pattern sequence SB to output, respectively. Then, the drive section 5 outputs MEV in accordance with SA and SB sequentially input, resultantly, transmission information TX is output as light P having a time-sequence luminance variation pattern including SB, SA, SB, SA, SA, SB, SB, SB, . . . from the light emitting section 8.

Additionally, in this embodiment, at the light receiving unit 20, the first pattern sequence SA and second sequence pattern SB must be set to be different from a luminance variation pattern for disturbance light that causes noise. Moreover, it is important that these pattern sequences have neither large difference in the numbers of "1" (lighting-on) and "0" (lighting-off) nor regularities as in asynchronous pseudo-random number patterns.

Moreover, in this embodiment, the number of bits of the first pattern sequence SA and that of second pattern sequence SB are 5. However, the present invention is not limited to this. For example, if the number of bits increases, distinction of luminance variations of disturbance light can be easily made. Contrarily, transmission efficiency is lost. Accordingly, the number of bits may be flexibly set depending on whether importance should be placed on exclusion of disturbance light or transmission efficiency of transmission information TX.

Figure 2B:
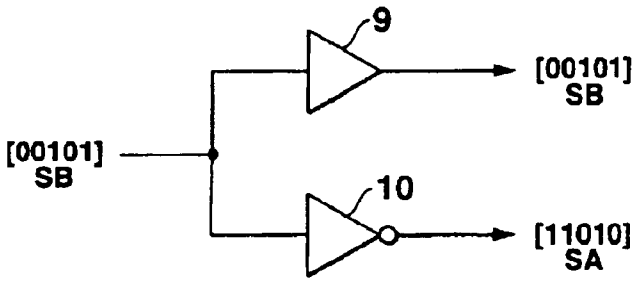

Still moreover, in this embodiment, in the first pattern sequence and second pattern sequence, the other pattern sequence may be generated from one pattern sequence. In this case, for example, as shown in FIG. 2B, the second pattern sequence SB is passed through a non-reverse buffer 9 and a reverse buffer 10, thereby generating the first pattern sequence SA and second sequence pattern SB. Namely, in FIG. 1, the first pattern sequence generating section 3 and second pattern sequence generating section 4 can be formed as a single configuration.

Figure 3:
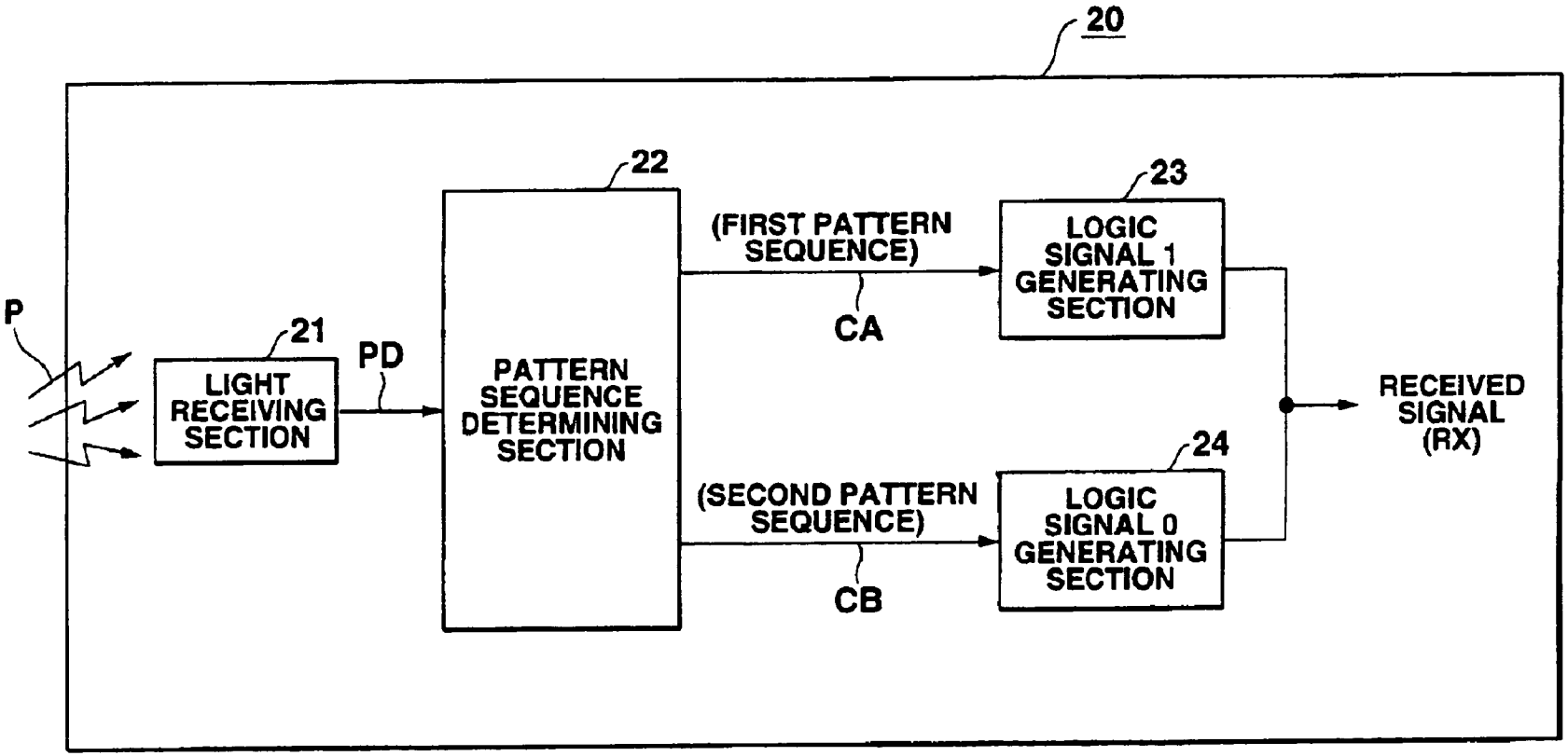
FIG. 3 is a conceptual structural view of a light receiving unit 20.

FIG. 3 is a conceptual structural view of the light receiving unit 20. The light receiving unit 20 is composed of a light receiving section 21, a pattern sequence determining section 22, a logic signal 1 generating section 23, and a logic signal 0 generating section 24. The light receiving section 21 converts an external light into an electrical light. Particularly, the light receiving section 21 receives light P output from the light emitting unit 1 and determines ON (lighting-on) interval of the light P and OFF (light-off) interval thereof, thereby performs a logical determination to generate a digital signal PD based on the logical determination.

The pattern sequence determining section 22 stores two reference pattern sequences (SAr/SBr) and compares pattern sequences (SA/SB) contained in a bit array of digital a signal PD with reference pattern sequences (SAr/SBr). When SAr pattern is contained in the bit array of digital signal PD, the pattern sequence determining section 22 outputs a first pattern sequence determination signal CA during the interval. While, when SBr pattern is contained in the bit array of digital signal PD, the pattern sequenced determining section 22 outputs a second pattern sequence determination signal CB during the interval.

For the duration of time that the pattern sequence determining section 22 outputs the first pattern sequence determining signal CA, the logic signal 1 generating section 23 generates a logic signal 1. For the duration of time that the pattern sequence determining section 22 outputs the second pattern sequence determining signal CB, the logic signal 0 generating section 24 generates a logic signal 0. The logic signal 1 generating section 23 and logic signal 0 generating section 24 output these logic signals in time sequence, thereby reproduce receive information RX based on light P received in time sequences.

According to the above-explained structure, in the case where transmission information TX having a bit sequence of "01011000" is provided to the light emitting unit 1, the logical determining section 2 reads the respective bits of transmission information TX one bit by one and determines the logic. When the determination is a logic signal 1, the logical determining section 2 outputs of a pattern generating command C1 to the first pattern sequence generating section 3. When the determination is a logic signal 0, the logical determining section 2 outputs a pattern generating command C0 to the second pattern sequence generating section 4.

Next, when the logical determining section 2 outputs the pattern generation command C1/C0, the first pattern sequence generating section 3 and second pattern sequence generating section 4 generate the corresponding first pattern sequence SA and second pattern sequence SB to output sequentially.

Then, the drive section 5 outputs a drive signal MEV according to the first pattern sequence SA and second pattern sequence SB thus output, and light P having a time-sequence luminance variation is output from the light emitting section 8.

While, when receiving light P from the light emitting unit 1 in time sequence, the light receiving section 21 of the light receiving unit 20 outputs a digital signal PD based on the luminance variation in time sequence. Then, the pattern sequence determining section 22 compares PD with each of the reference pattern sequences (SAr/SBr).

Then, in the pattern sequence determining section 22, each of the reference pattern sequences SAr/SBr is determined to be matched/mismatched with PD, and first pattern sequence determination signal CA and second pattern sequence determination signal CB are output for each determination result.

The logic signal 1 generating section 23 and logic signal 0 generating section 24 generate logic signal 1 and logic signal 0, respectively based on the determination result obtained by the pattern sequence determining section 22, and finally reproduce receive information RX having the same bit sequence ("01011000) as transmission information TX.

(First Embodiment)

Figure 4A:
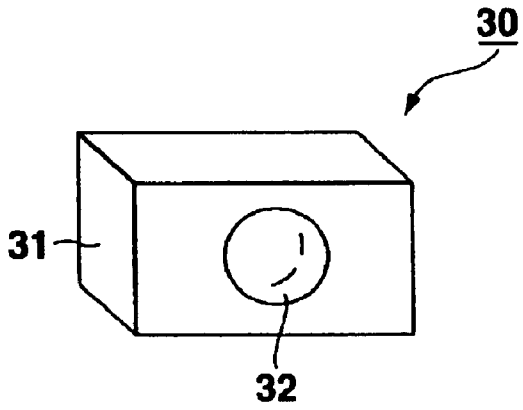
FIGS. 4A-4C show a front perspective view of a light emitting unit 30, a front perspective view of a light receiving unit 40, and a rear perspective view of the light receiving unit 40.
Figure 4B:
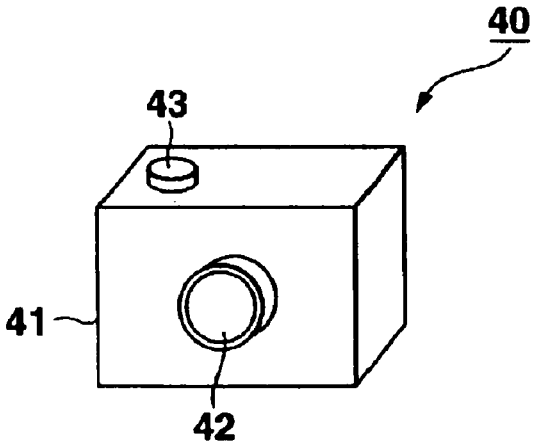
Figure 4C:
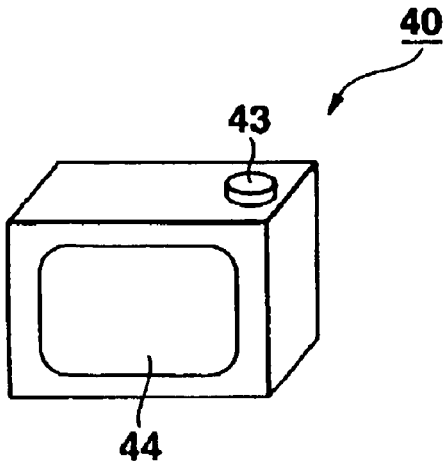

A specific explanation is next given of a first embodiment to which the present invention is applied. FIG. 4 is a view showing the light emitting unit and light receiving unit, and 4A is a front perspective view of the light emitting unit 30, 4B is a front perspective view of the light receiving unit 40, and 4C is a rear perspective view of the light receiving unit 40. The light emitting unit 30 is structured such that a light emitting window 32 is attached to an outer case 31 with an appropriate shape (preferably an outer case with a drip-proof construction suitable for outdoor installation). Further, the light receiving unit 40 is an image pickup device, such as a digital camera, which is structured such that an optical lens section 42, a shutter key 43, and a liquid crystal display 44 are attached to a body 41 with a shape suitable for hand-holding.

Figure 5A:
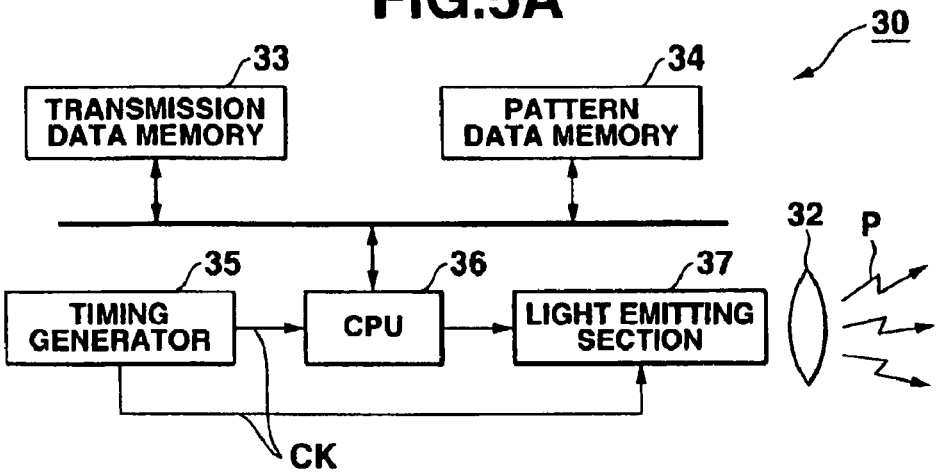
FIGS. 5A and 5B show a structural view of an electrical interior of the light emitting unit 30 and the light receiving unit 40.

FIG. 5 is a structural view of an electrical interior of the light emitting unit 30 and the light receiving unit 40. In this figure, the light emitting unit 30 is composed of a transmission data memory 33, a pattern memory 34, a timing generator 35, a CPU 36, a light emitting section 37, and a light emitting window 32. Further, the light receiving unit 40 is composed of an optical lens section 42, a shutter key 43, an image pickup section 45, a capture image buffer 46, a display buffer 47, a liquid crystal display 44, a timing generator 48, a CPU 49, a pattern data memory 50, a reference image buffer 51, a frame time sequence buffer 52, a correlation evaluation image buffer 53, a working buffer 54 for binarization, and the like and a data list memory 55. In addition, the illustrations of power source sections (battery, etc.) for the light emitting unit 30 and light receiving unit 40 is omitted.

The functions of the respective sections are explained. First, the timing generator 35 of light emitting unit 30 generates a clock signal CK with a given stable periodicity that is synchronous with an image capture clock signal PCK of the timing generator 48 of light receiving unit 40 to be described later.

The CPU 36 of light emitting unit 30 fetches the ith bit of the transmission information TX stored in the transmission data memory 33 in synchronization with the clock signal CK sent from the timing generator 35, and determines the bit value. CPU 36 fetches a first pattern sequence SA from the pattern data memory 34 in the case of logic signal 1. CPU 36 fetches a second pattern sequence SB from the pattern data memory 34 in the case of logic signal 0. Then, CPU 36 outputs the first pattern sequence SA and second pattern sequence SB to the light emitting section 37. The light emitting section 37 performs such an operation that turns on light at an interval of logic signal 1, and turns off light at an interval of logic signal 0, and outputs light P with a time sequence luminance variation pattern through the light emitting window 32.

While, the image pickup section 45 of light receiving unit 40 is composed of an image sensor such as CCD (Charge-Coupled Devices), CMOS (Complementary Metal-Oxide Semiconductor). The image pickup section 45 converts an image of a subject captured through the optical lens section 42 into an electrical frame image signal to output to the capture image buffer 46 at the periodicity synchronized with the capture image clock signal PCK. The CPU 49 of receiving light unit 40 controls the entire operation of receiving light unit 40. The CPU 49 performs processing for sending the frame image captured into the capture image buffer 49 to the display buffer 47 directly to be displayed on the liquid crystal device 44 and processing for capturing the image captured into the display buffer 47 into an image memory (not shown) at the time of operating the shutter key 43. In addition to this, the light receiving unit 40 has the characteristics in performing the following processing.

Namely, the CPU 49 of light receiving unit 40 stores the frame images, which are captured into the capture image buffer 46 in synchronization with the capture clock signal PCK, in the planes of the frame time sequence buffer 52 for each frame image, respectively. Here, the frame time sequence buffer 52 includes 1st plane to nth plane each having storage capacity corresponding to the size of one frame image, and the number n of planes corresponds to at least the number N of bits of the pattern sequences (SA/SB) in the light emitting unit 30. For example, in the example of the above embodiment, since the number of bits of SA and SB is 5 bits (N=5), the number of planes of the frame time sequence buffer 52 becomes the first plane to fifth plane. For the sake of expediency, in the following explanation, it is assumed that the number N of bits of the pattern sequences (SA/SB) is set to 5 bits and that the number n of planes is also set to 5.

The order of writing the frame image into the first plane to fifth plane is shown as follows:

First frame image=First plane
Second frame image=Second plane
Third frame image=Third plane
Fourth frame image=Fourth plane
Fifth frame image=Fifth plane
Sixth frame image=First plane
Seventh frame image=Second plane
Eighth frame image=Third plane
Ninth frame image=Fourth plane
Tenth frame image=Fifth plane Thus, the writing operation from the first plane to fifth plane is cyclically performed.

The CPU 49 of light receiving unit 40 extracts a pixel area having a time sequence luminance variation pattern from the frame image written into each plane in parallel with control of the writing order to each plane (actually, control of a value of buffer pointer n of the frame time sequence buffer 52 to be described later). Moreover, the CPU 49 binarizes the luminance variation pattern using the working buffer 54 for binarization, and compares the binarized data (corresponding to the above digital signal PD) with the reference pattern sequence (SAr/SBr) held in the pattern data memory 50. When the binarized data matches SAr, the CPU 49 generates a logic signal 1. On the other hand, when the binarized data matches SBr, the CPU 49 generates a logic signal 0. Then, the CPU 49 stores these logic signals to the data list memory 55. Further, the liquid crystal display 44 of light receiving unit 40 displays a subject image including a light emitting area due to the light emitting unit 30, and further overlaps information relating to the light emitting area, in the form of graphics such as speech balloon, on a specific portion of the display area (for example, central portion of the screen) to display thereon. In addition, the reference image buffer 51 is used for correction for hand movements, and the way of using will be described later.

Figure 6:
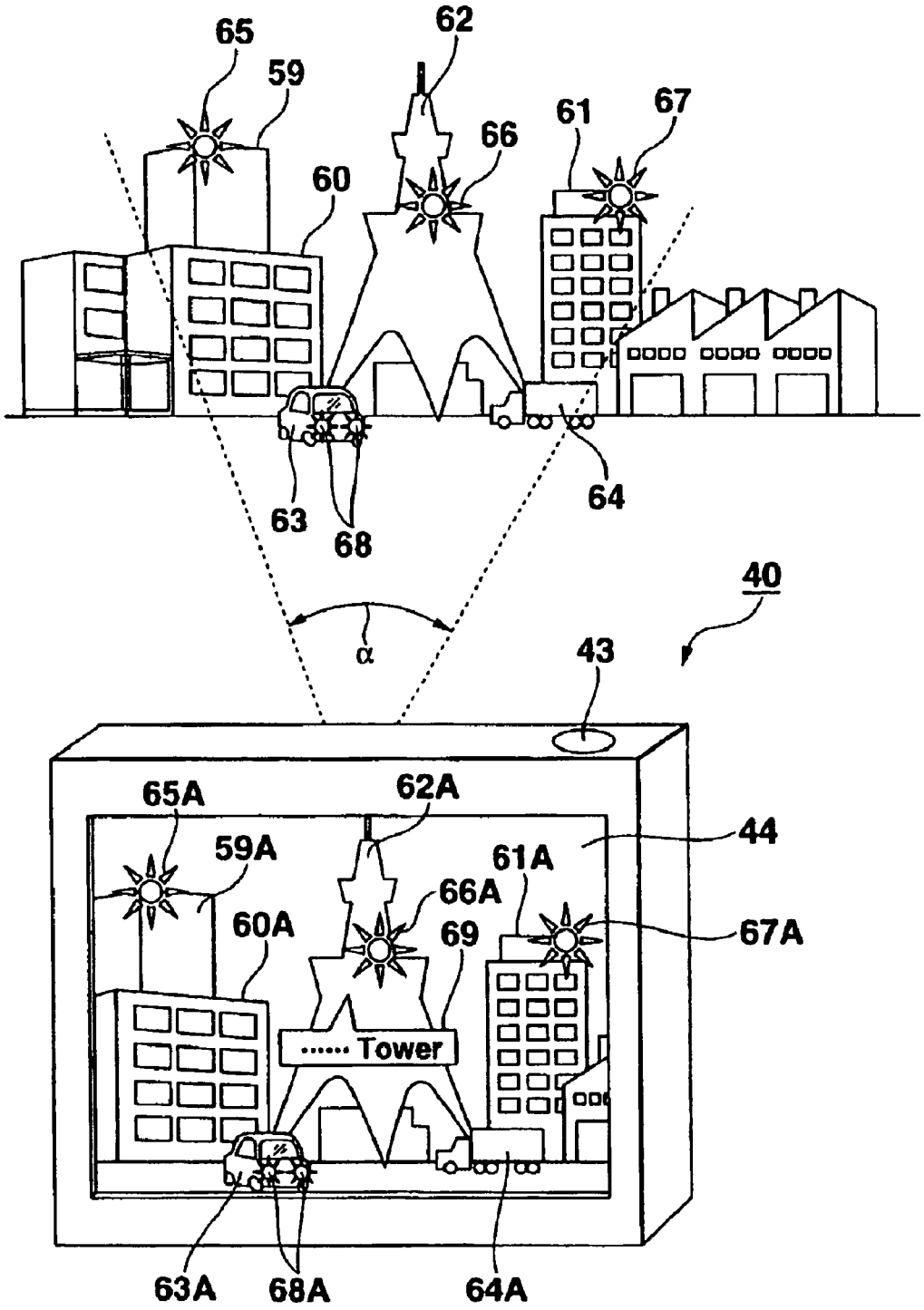
FIG. 6 is a view showing an example of the use of the light emitting unit 30 and the light receiving unit 40.

FIG. 6 shows a specific using form of the light emitting unit 30 and light receiving unit 40. In the same figure, the light receiving unit 40 is directed to midtown landscape at a field angle α. Buildings 59, 60, 61, TV tower 62, cars 63, 64 are present within the field angle α. Among these, the light emitting units 30 are attached to the buildings 59, 61, and TV tower 62 (positions of spots 65 to 67), respectively. The user of light emitting unit cannot visually identify the light emitting units 30 themselves, but each light emitting unit 30 emits light P having a time sequence luminance variation pattern, and spots 65 to 67 correspond to the light P. In addition to the spots 65 to 67, a headlight beam 68 of the car 63 is present within the field angle α as disturbance light.

On the liquid crystal display 44 of light receiving unit 40, images of buildings 59, 60, 61, TV tower 62, cars 63, 64 (building images 59A, 60A, 61A, TV tower image 62A, car images 63A, 64A), spot images 65A to 67A and headlight beam 68, which are present within the field angle α are displayed.

The light receiving unit 40 extracts spot images 65A to 67A, and compares the luminance variation pattern with each of reference patterns (SAr/SBr). When the luminance variation pattern matches with SAr, the light receiving unit 40 generates a logic signal 1. When the luminance variation pattern matches with SBr, the light receiving unit 40 generates a logic signal 0. Then, the light receiving unit 40 performs string conversion on a bit sequence composed of logic signal 1 and logic signal 0, and overlaps the conversion result on the extracted image, in the form of graphics 69 such as speech balloon, to display on the liquid crystal display 44.

According to the image transmission system having such an effect, the user of light receiving unit 40 can obtain information such as name of building, tenant, etc. from remote locations by the light emitting units 30 attached to the various kinds of landmarks in the urban area. Moreover, if the light emitting units 30 are attached to commodities displayed at the store and objects shown at the museum, exhibition, etc. instead of the large-scale object such as building, it is possible to obtain information on commodity names, explanation of exhibits.

Additionally, this embodiment exemplifies the headlight beam 68 as disturbance light, but the present invention is not limited to this. Even if a fluorescent lamp is used, it is possible to distinguish between each spot and the fluorescent lamp. In the case of flashing lights having periodicity as in the fluorescent lamp, the flashing period is synchronous with the frequency of power source, and this is clearly different from the luminance variation pattern of light P of each spot.

Figure 7:
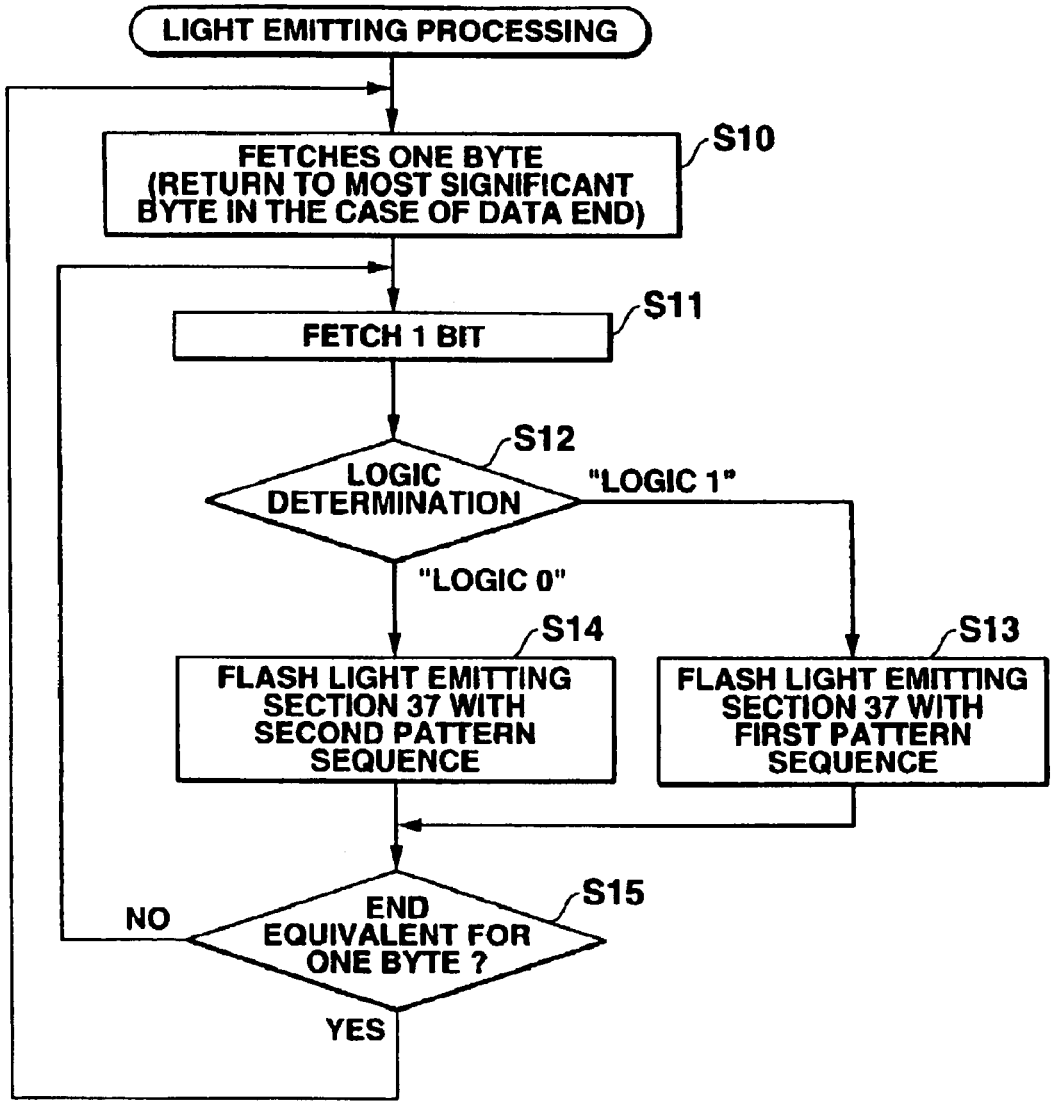
FIG. 7 is a flowchart of a light emission processing program executed by a CPU 36 for the light emitting unit 30.

FIG. 7 is a flowchart of a light emission processing program executed by the CPU 36 of light emitting unit 30. In this flow, the CPU 36 fetches one byte (8 bit) information from transmission information TX stored in the transmission data memory 33 (step S10). Next, the CPU 36 fetches the most significant 1 bit of the information (step S11), and performs determination (step S12). If the determination is a logic signal 1, the CPU 36 flashes the light emitting section 37 with a first pattern sequence (SA) (step S13). If the determination is a logic signal 0, the CPU 36 flashes the light emitting section 37 with a second pattern sequence (SB). Then, the CPU 36 repeats the above processing which is the equivalent of one byte (step S15). Thereafter, the operation goes back to step S10 again to execute the processing, and the processing is ended when reaching the last of information.

Figure 8:
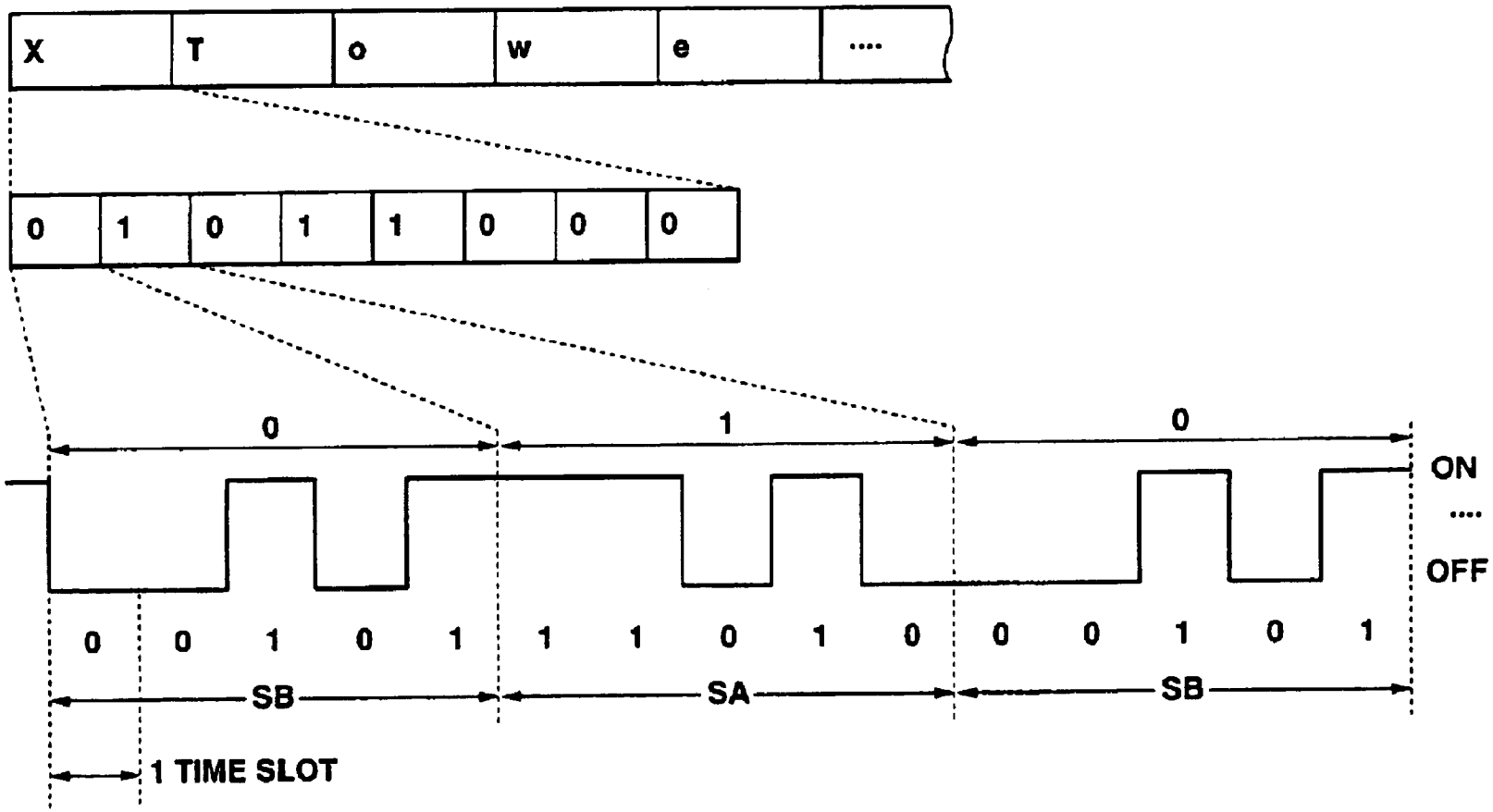
FIG. 8 is a timing chart of light emitting operations of the light emitting unit 30.

FIG. 8 is a timing chart of the light emitting operation of light emitting unit 30. In this example, it is assumed that a character string including "X", "T", "o", "w", "e" as transmission information TX. The respect bits of the bit sequence corresponding to the character string are converted into a first pattern sequence (SA: 11010) or second pattern sequence (SB: 00101). The light emitting section 37 of light emitting unit 30 flashes with the first pattern sequence (SA: 11010) or second pattern sequence (SB: 00101), to output the aforementioned transmission TX with the flashing pattern.

Figure 9:
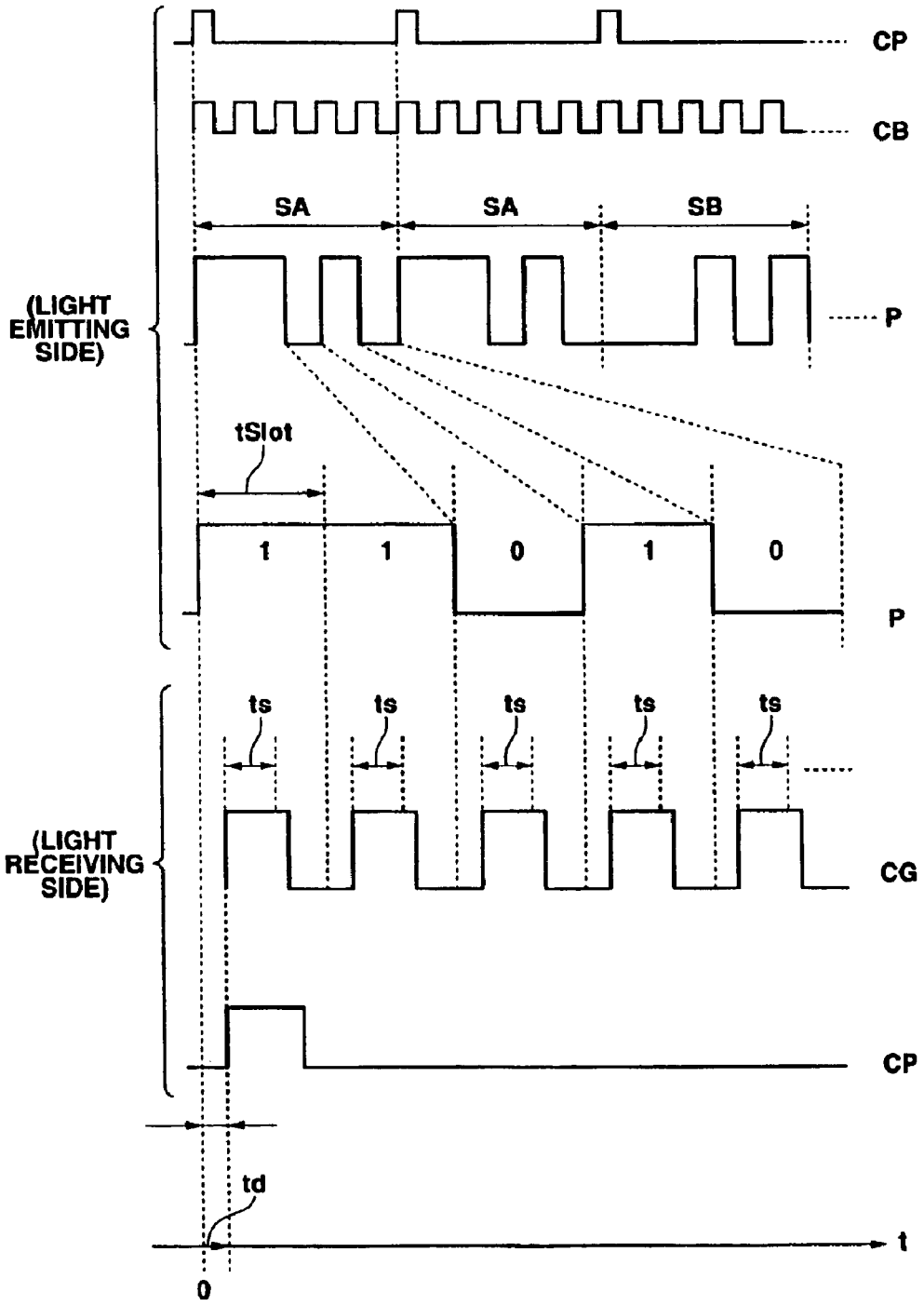
FIG. 9 is a timing chart of the light emitting side (light emitting unit 30 side) and a light receiving side (light receiving unit 40 side)

FIG. 9 is a timing chart for the light emitting side (light emitting unit 30) and light receiving side (light receiving unit 40). On the light emitting side, a pattern change clock CP occurs once every time when a clock signal is generated five times. Further, a bit output clock CB is generated by the generator 35 of FIG. 5A.

Figure 5B:
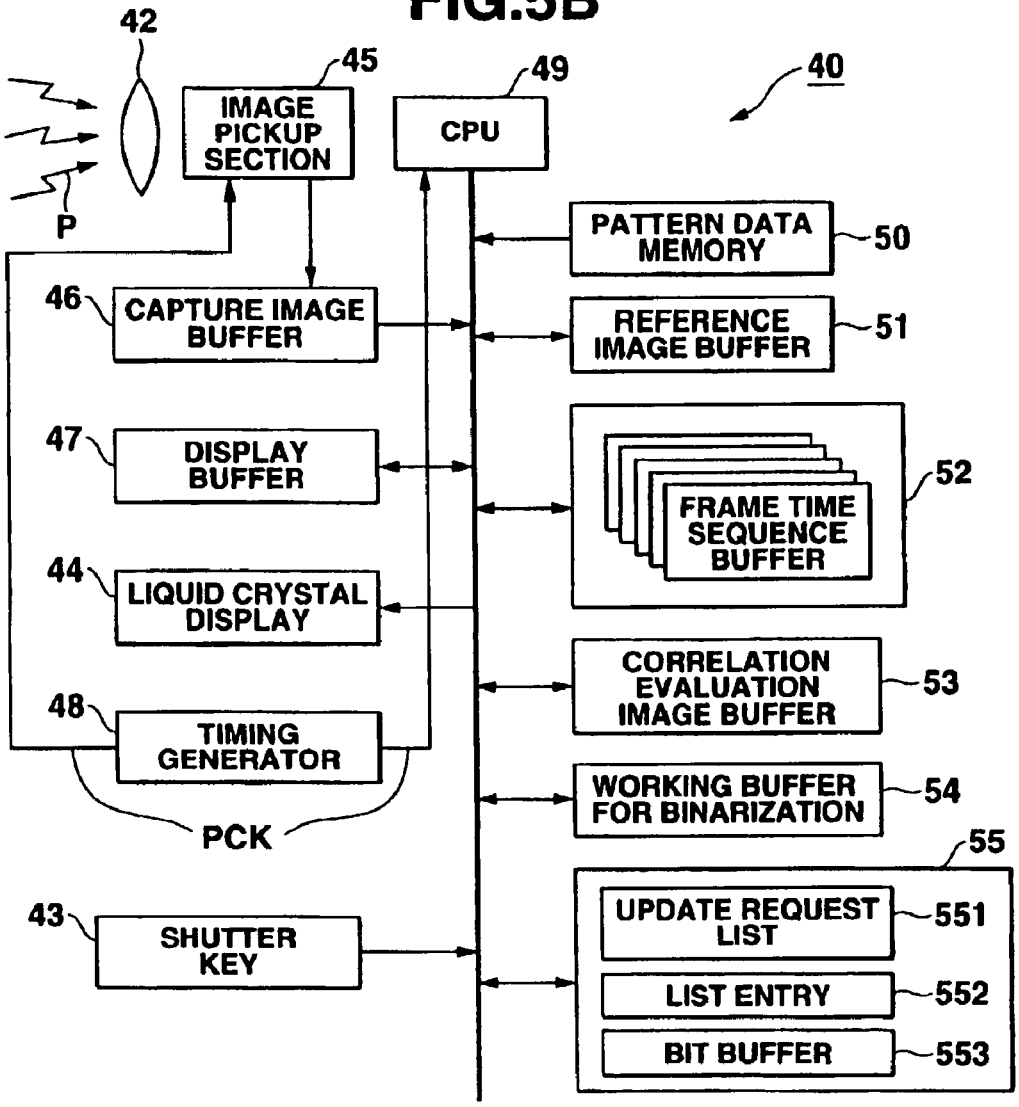

While, on the light receiving side, the pattern change clock CP resets a pointer for designating a writing plane of the frame time sequence buffer 52 shown in FIG. 5B. Additionally, fetching of byte data shown in FIG. 7 (step S16) is performed in synchronization with this CP. Moreover, fetching of one bit (step S11), logic determination (step S12), and pattern sequence selection (steps S13, S14) are performed in synchronization with the clock signal CK output from the timing generator 35.

One flashing period (tSlot) of light P on the light emitting side is set in consideration of image pickup shutter time (ts) on the light receiving side. Further, the light receiving side sets a phase shift (td) between the light receiving section and emitting side to be within the range set forth below such that image pickup (switch detection of ON (lighting-on)/OFF (lighting-off) of light P) can be performed timely at one flashing period (tSlot) set on the transmitting side.

Namely, in the case where a phase on the light receiving side slightly delays, one flashing period (tSlot) is set to time that is longer than the total of image pickup shutter time (ts) and the phase shift (td). Conversely, in the case where a phase on the light receiving side slightly advances, one flashing period (tSlot) is set such that the phase shift (td) becomes small enough to be negligible with respect to image pickup shutter time (ts).

Figure 10:
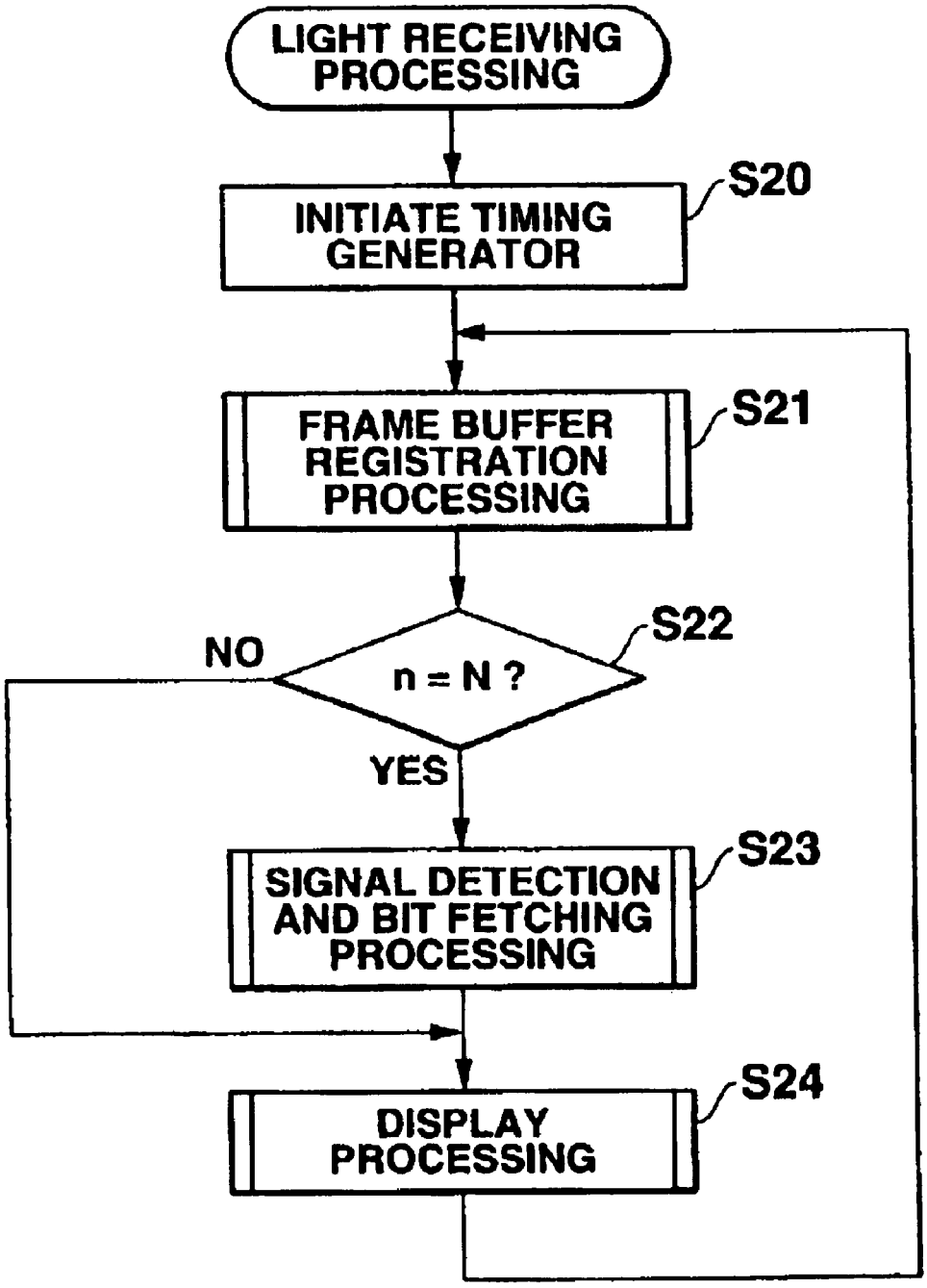
FIG. 10 is a flowchart of a light reception processing program executed by a CPU 49 for the light receiving unit 40.

FIG. 10 is a flowchart of a light reception processing program executed by the CPU 49 of light receiving unit 40. When this flow is started, first, the CPU 49 initiates the timing generator 48 (step S20), and then executes the repetition of the following processing.

<Frame Buffer Registration Processing>: Step S21

Figure 11:
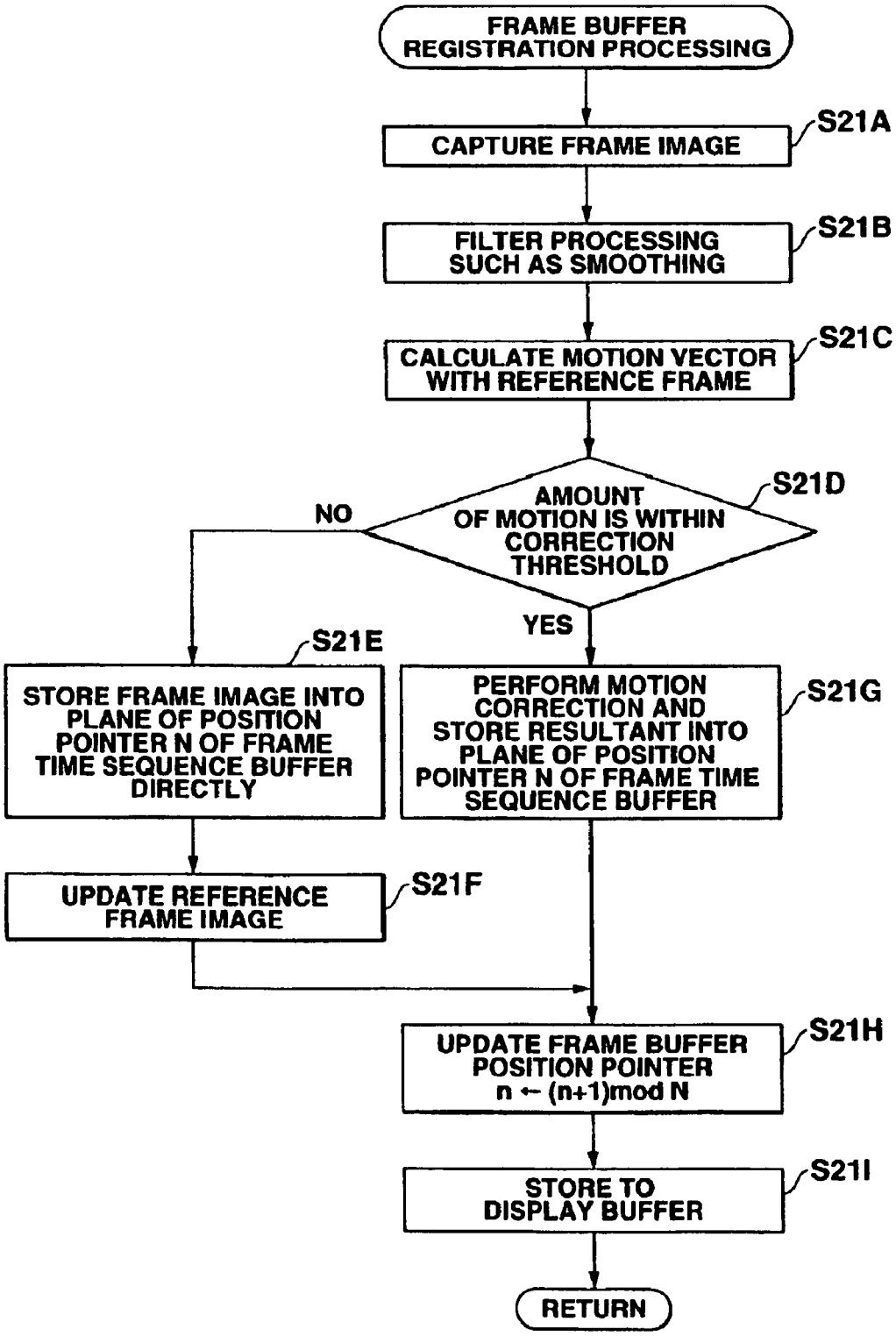
FIG. 11 is a flowchart of a frame buffer registration processing subroutine program.

FIG. 11 is a flowchart of a frame buffer registration processing subroutine program. In this flow, first, the CPU 49 fetches a frame image to the capture image frame buffer 46 from the image pickup section 45 (step S21A). Next, the CPU 49 performs filter processing such as smoothing on the frame image (step S21B). After that, the CPU 49 performs frame correlation processing using the frame image subjected to the filter processing and a reference frame image in the reference image buffer 51, and resultantly detects a motion-vector (step S21C). The CPU 49 determines whether or not the amount of motion vector is within a corrected threshold (step S21D).

In the case where the amount of motion vector is not within the threshold, the CPU 49 determines that the frame image is one that has no motion or a small amount of motion and stores the frame image into the plane designated by the buffer pointer n of the frame time sequence buffer 52 (step S21E), and replaces the reference frame image of reference image buffer 51 with this frame image (step S21F).

While, in the case where the amount of motion vector is within the threshold, the CPU 49 determines that the frame image is one that has a large amount of motion and performs motion correction on the frame image, and stores the corrected frame image into the plane designated by the buffer pointer n of the frame time sequence buffer 52 (step S21G).

Next, the CPU 49 updates the buffer pointer n to store the capture image into the display buffer 47 and then processing goes back to the flow of FIG. 10. Additionally, in the case of buffer pointer n=maximum value N, the operation proceeds to signal detection and bit fetching processing in step S23.

<Signal Detection and Bit Fetching Processing>: Step S23

Figure 12:
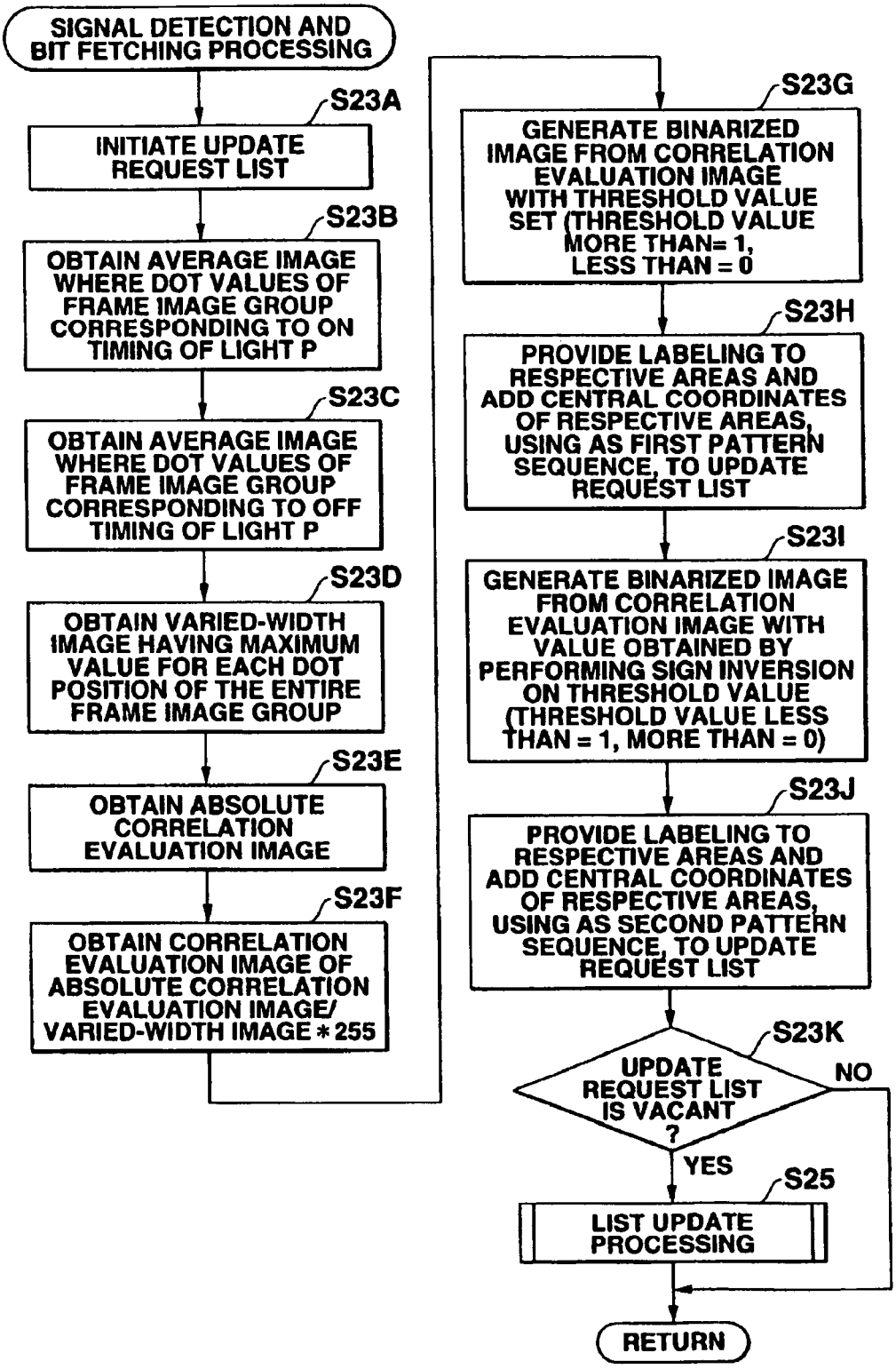
FIG. 12 is a flowchart of a signal detection and bit fetch processing subroutine program.

FIG. 12 is a flowchart of signal detection and bit fetching processing subroutine program. In this flow, first, the CPU 49 initiates an update request list 551 in the data list memory 55 (step S23A). Next, the CPU 49 reads a frame image group corresponding to ON (lighting-on) timing of light P from the frame time sequence buffer 52 to obtain an average image where the respective bit values are averaged (step S23B). Then, the CPU 49 reads a frame image group corresponding to OFF (lighting-off) timing of light P to obtain an average image where the respective bit values are averaged in the similar way (step S23C).

After that, the CPU 49 obtains a varied-width image having a maximum brightness for each dot position of the entire frame image group (step S23D). Next, obtains an absolute correlation evaluation image, which is expressed by an absolute value obtained by subtracting the average image obtained in step S23C from the average image obtained in step S23B (step S23E). Then, the CPU 49 obtains a correlation evaluation image, which is normalized by absolute correlation evaluation image/varied-width image ×255, based on the absolute correlation evaluation image (step S23F).

With reference to the correlation evaluation image thus obtained, it can be understood that an image area varied as a first pattern sequence obtains a high correlation value in a positive direction and that an area varied as a second pattern sequence obtains a high correlation value in a negative direction.

Sequentially, the CPU 49 generates a binarized image from the correlation evaluation image obtained in step S23F (step S23G), provides labeling to the respective areas in the binarized image with respect to the same continuous areas, and adds central coordinates of the respective areas, using as a first pattern sequence, to the update request list 551 (step S23H).

Next, the CPU 49 performs a sign inversion on the threshold of correlation evaluation image to generate a binarized image (step S231), and adds central coordinates of the respective areas, using as a second pattern sequence, to the update request list 551 in the same manner as the above (step S231). After that, the CPU 49 determines whether or not the update request list 551 is vacant, and proceeds to list update processing in step S25 when the update request list 551 is not vacant.

Figure 13:
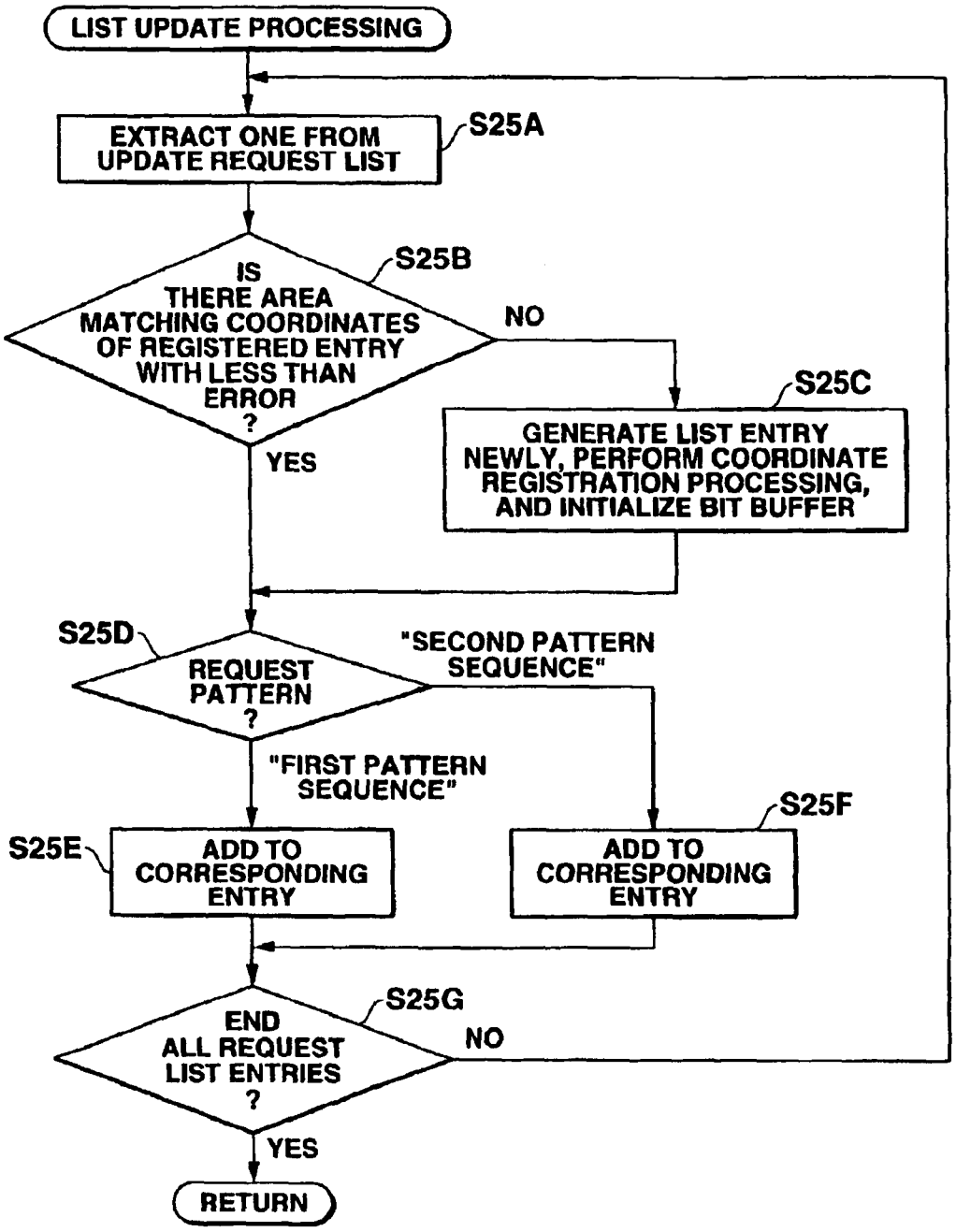
FIG. 13 is a flowchart of a list update processing subroutine program.

FIG. 13 is a flowchart of a list update processing subroutine program. First, the CPU 49 extracts one pattern (hereinafter referred to as request pattern) from the update request list 551 set in the step 23 (step S25A), and determines whether or not there is an area that matches coordinates registered in advance in the request pattern (step S25B). Then, in the case where there is one that matches the coordinates, the CPU 49 determines whether the request pattern is the first pattern sequence or second pattern sequence (step S25D). Additionally, in the case where the request pattern is neither the first pattern sequence nor second pattern sequence, the CPU 49 newly generates a list entry 552 and performs coordinate registration processing and initializes the bit buffer 553 (step S25C), and then determines a request pattern (step S25D).

In the case where the request pattern is the first pattern sequence, the CPU 49 adds "1" to the corresponding entry of the bit buffer 553 (step S25E). In the case where the request pattern is the second pattern sequence, the CPU 49 adds "0" to the corresponding entry of the bit buffer 553 (step S25F). In either case, the above processing is repeated until the end of step S25G, and the operation proceeds to processing in step S24 of FIG. 10.

<Display Processing>: Step S24

Figure 14:
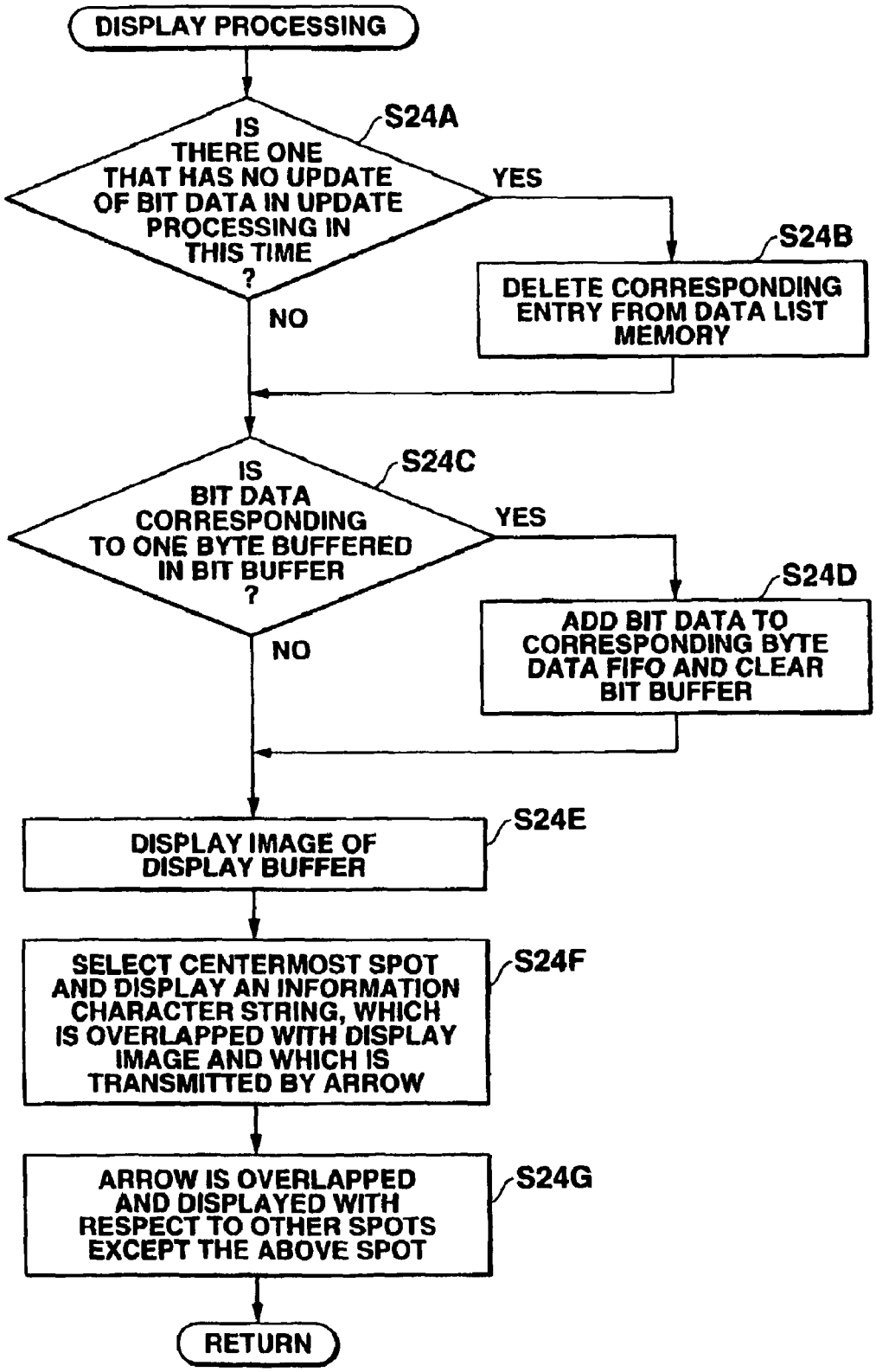
FIG. 14 is a flowchart of a display processing subroutine program.

FIG. 14 is a flowchart of display processing subroutine program of step S24. In this flow, first, the CPU 49 determines whether or not there is one that has no update of bit data in update processing in this time (step S24A). In the case where there is one that has no update of bit data, the CPU 49 deletes the corresponding entry from the data list memory 55 (step S24B). While, in the case where there is one that has update of bit data, the CPU 49 determines whether or not bit data corresponding to one byte is buffered in the bit buffer 553 (step S24C).

In the case where bit data corresponding to one byte (8 bits) is not buffered in the bit buffer 533, the CPU 49 sends an image of display buffer 47 to the liquid crystal display 44 to display (step S24E). In the case where bit data corresponding to one byte (8 bits) is buffered in the bit buffer 533, the CPU 49 adds the bit data to byte data FIFO (not shown) of data list memory 55, and clears the bit buffer 553 (step S24D). Thereafter, the CPU 49 transfers the image of display buffer 47 to the liquid crystal display 44 to display (step S24E). Next, the CPU 49 selects a centermost spot corresponding to light P, and display an information character string, which is overlapped with the display image and which is transmitted by an arrow and light P (step S24F). With respect to the other spots except the above spot, only the arrow is overlapped and displayed (step S24G) and then processing goes back to the flow of FIG. 10.

Additionally, in frame buffer registration processing of FIG. 11, there is no consideration of correction for movement of shot images caused by user's hand movements. In such a case, there is a problem in which execution of signal detection and bit fetching processing causes trouble in correlation calculation (steps S23e, S23f).

Figure 15:
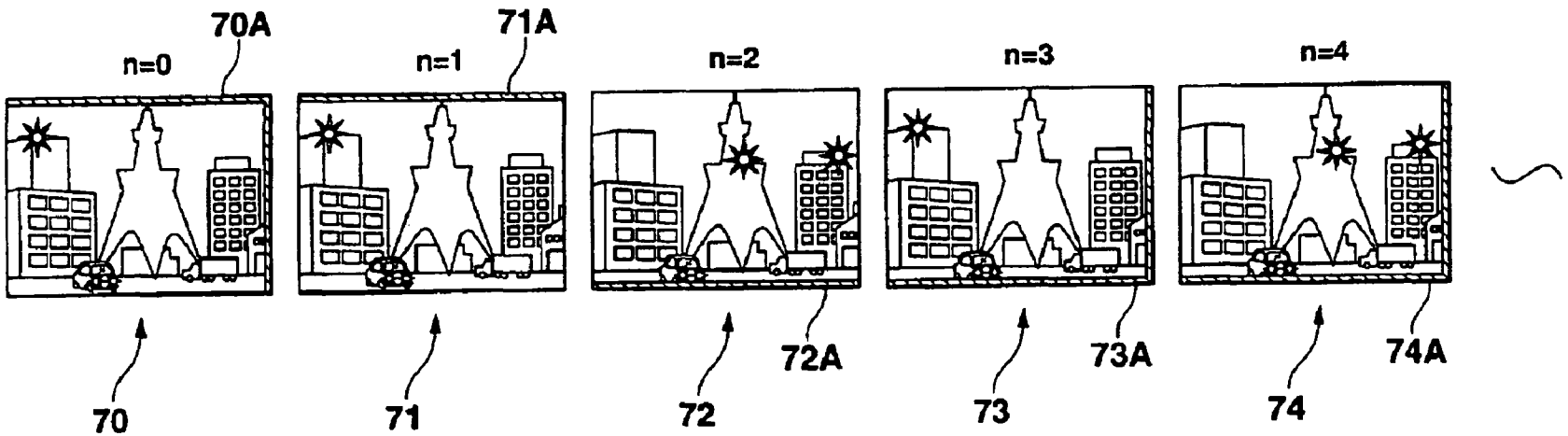
FIG. 15 is a conceptual view of correction for hand movements in a frame buffer registration processing.

FIG. 15 illustrates the respective frame images when image shooting with user's hand movements occur in consideration of the above-mentioned problem.

In the same figure, five images 70 to 74 are frame images stored in the respective planes of frame time sequence buffer 52, each value n indicates a pointer value in the frame time sequence buffer 52. The respective frame images 70 to 74 detect motion caused when shots with user's hand movements occur (hatched areas 70A to 74A of the frame images 70 to 74 represent omitted-pixel areas with compensation of movement). In this state, an amount of movement between each frame image and the reference frame image stored in the reference image buffer 51 is detected and the respective frame images 70 to 74 are moved horizontally, thereby eliminates the problem caused in the correlation calculation.

Figure 16:
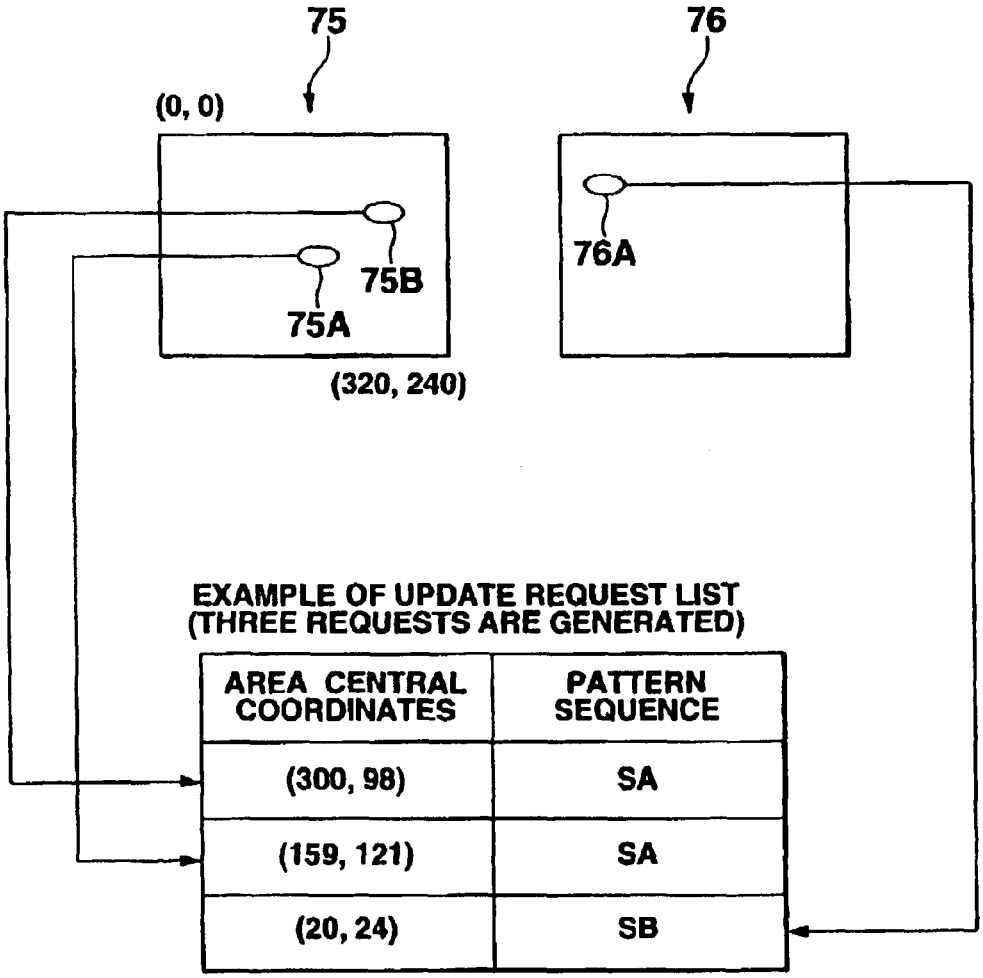
FIG. 16 is a conceptual view of a correlation calculation in a signal detection and bit fetch processing program.

FIG. 16 is a conceptual view of correlation calculation (step S23F, S23F) in the signal detection and bit fetching processing program of FIG. 12. It is assumed that spots 75A, 75B, and 76A are contained in two correlation evaluation object images 75 and 76, respectively.

Here, one image 75 is one that is binarized after correlation evaluation is performed on the first pattern sequence SA, and the other image 76 is one that is binarized after correlation evaluation is performed on the second pattern sequence SB. It is assumed that coordinate positions in the images of spots 75a, 75b, 76a are respectively set to (300, 98), (159, 121), (20, 24) for reasons of expediency. In this case, in the update request list 551, there are stored coordinates (300, 98) and pattern sequence "SA(first pattern sequence)" as information of spot 75b, coordinates (159, 121) and pattern sequence "SA(first pattern sequence)" as information of spot 75a, and coordinates (20, 24) and pattern sequence "SB(second pattern sequence)" as information of spot 76a, respectively.

FIG. 17 is an example showing a storage state of data list memory 55 after the list update processing program of FIG. 13 is executed.

After the list update processing program is executed, logic signal 0 and logic signal 1 are stored in the bit buffer 553 and the bit buffer 553 is cleared when data corresponding to 8 bits is stored. For example, FIGS. 17A to 17B illustrates a state up to the time when the entry of coordinates (20,24) corresponding to the spot 76A of FIG. 16 is just ended. Namely, in FIG. 17B, 01000001=41H=information character string is stored in the right bit buffer 'A' and the entry of coordinates (300, 98) corresponding to spot 75B is started.

As explained above, according to the first embodiment, the light receiving unit 40 performs reception and detection of the spot using light P of the light emitting unit 30 existing in the field angle by shooting, binaries the pattern with light emission intensity of the spot. Also, the light receiving unit 40 determines whether or not the binarized pattern matches any one of the pre-prepared pattern sequences whose correlation is low each other. Then, the light receiving unit 40 performs conversion to logic signal 1 or 0 based on the determination result and reproduces transmission information TX. Accordingly, it is possible to exclude the influence of disturbance light, which does not include such a corresponding pattern sequence, without fail.

Further, according to FIG. 15, it is possible to perform correction for movement of the shot image caused by user's hand movement. For this reason, even if the user performs shooting with the light receiving unit 40 held by hands, reproduction of transmission information TX can be carried out to make it possible to improve the usability.

Figure 18A:
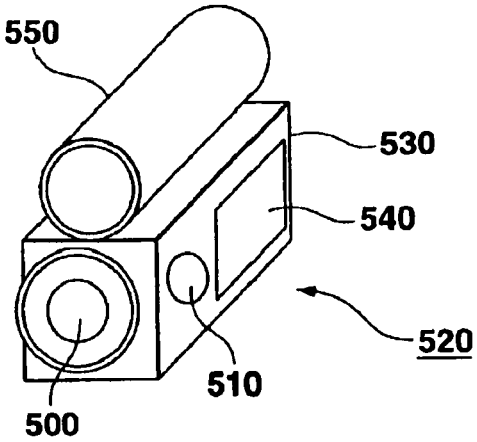
FIGS. 18A-18C are views of another embodiment of the light receiving unit 40.

In addition, the above explanation exemplified one having the liquid crystal finder (liquid crystal display 44) such as electronic still camera as light receiving unit 40. However, the present invention is not limited to this. For example, as shown in FIG. 18A, it is possible to use a light receiving unit 520 provided with a body 530 having an optical lens 500, a control button 510, a display section 540 for displaying character information, a direct-view finder 550 for adjusting an image direction.

Figure 18B:
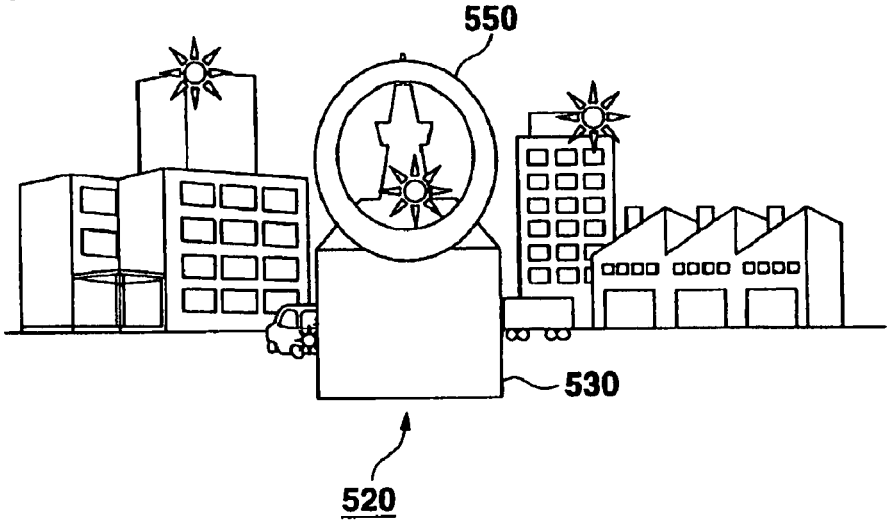
Figure 18C:
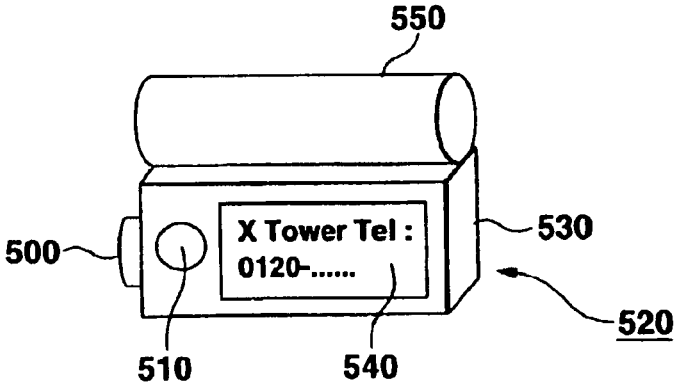

Accordingly, the user looks through the direct-view finder 550, places the shooting direction toward a target object and presses the control button 510, and thereby making it possible to receive information from the target object to be displayed on the display section 540 as shown in the same FIG. 18B. This eliminates the need of using the relatively expensive liquid crystal finder (liquid display 44 of FIG. 5) and allows cost reduction in the light receiving unit 500 to be improved.

In addition, since the user cannot check the display of display section 540 while looking the direct-view finder 550, it is possible to issue an alarm for notification of information acquisition from the target object or a synthesized voice.

(Second Embodiment)

In the aforementioned first embodiment, an image with 40 frames (8×5 frames) at the minimum is required in order to transfer one character (use of non-compressed 8-bit code text data is assumed).

Accordingly, for example, such a disadvantage causes that time of 1.33 per sec. is required to transfer one character and more time is needed with an increase in the number of characters.

In order to avoid such a disadvantage, it is desirable that a frame rate should be simply increased. However, if the frame rate is set to 30 fps (frame/second) to obtain a 10-fold transfer rate, a frame rate of 30×10=300 fps will be required.

Further, a case may be considered that the number of dots for frame image is reduced in order to decrease the amount of data processing while increasing the frame rate (for example, if the amount of data is set to 1/10 in a state of 300 fps, an area to be detected may be reduced to a degree of, e.g., 228×152 dots, which is smaller than the number of pixels of the original image (e.g., 640×480 dots)).

However, in such a case, the area of one-dot pixel occupied in the field angle is also reduced. For this reason, a luminance variation in a part of area will occur with respect to 10-fold detecting area in the case of information transmission using a one-dot spot in 640×480 dots. In other words, such a drawback occurs that the width of the luminance variation in pixel is reduced to 1/10, and resultantly, falls below the detection limit. Namely, such a disadvantage is caused that an area to be detected with one dot from the light source is increased with a reduction in pixel definition.

As a result, for example, a light source having a 10-fold area (e.g., a glove-shaped light source) must be used in place of a quiet light source, e.g., a miniature bulb. Further, since amplitude in the luminance variation is decreased because of a decrease in one-dot pixel area, luminance at a lighting time must be increased to a predetermined magnification.

Accordingly, the aforementioned first embodiment has a drawback that cannot satisfy requirements of both an increase in the amount of data transfer as capturing the luminance variation in a small area (as making the number of pixels fine) and a decrease in the amount of processing data to be handled concurrently.

For the aforementioned reason, in order to improve the above drawback, the feature of the second embodiment lies in the following points:

(1) "Partial reading" is performed from a detection area of image pickup means and the read area is shifted for each cycle, thereby detecting a target modulation signal from the field angle with accuracy to perform decoding.

(2) By use of subsampling (skipping) function, signal detection is performed at a field angle using an image with a frame rate held.

(3) The above points (1) and (2) are combined.

The following specifically explains the second embodiment. Regarding the structural components common to the first embodiment, reference is made to the explanation and the corresponding figures described in the first embodiment. Also, only different structural components (structural components newly added) are illustrated.

Figure 19:
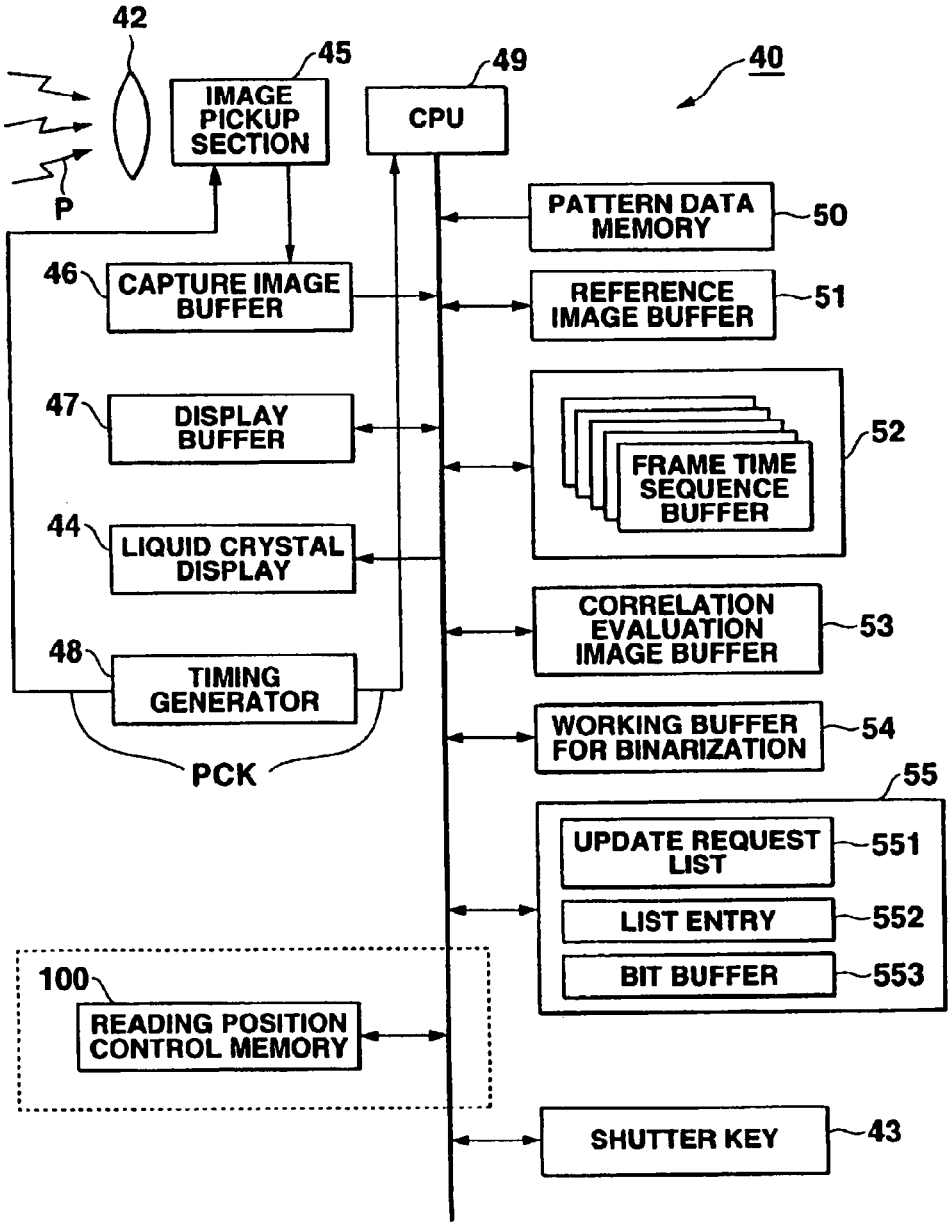
FIG. 19 is a structural view of an electrical interior of the light receiving unit 40 according to a second embodiment.

FIG. 19 is a structural view of an electrical interior of the light receiving unit 40 according to the second embodiment, and a view corresponding to FIG. 5B in the first embodiment. The point different from FIG. 5B is as follows:

The image pickup section 45 is an image pickup device (CMOS sensor, etc.) that can set a frame rate to a high value to make it possible to perform partial reading. It is assumed that the definition of area at the full field angle is 1280×960 dots and that the size of partial reading area is set to 320×240 dots.

Further, the image pickup section 45 is capable of capturing an image with 1280×960 full dots at the frame rate of 15 fps, and the partial reading area with 320×240 dots results in 1/16 of the full-dot area.

Accordingly, in the case where the partial reading is performed on the area with 320 ×240 dots, image capturing can be carried out at about 16-fold frame rate (about 240 fps).

The capture image buffer 46 has a capacity of 320×240 dots to store partial reading data. The display buffer 47 has a capacity of 1280×960 dots to monitor and display the full field angle of the image pickup section 45. Also, the frame time sequence buffer 52 is used to store partial reading data in time sequence, and each plane has a capacity of 320 ×240 dots. Each of the reference image buffer 51, correlation evaluation image buffer 53 and working buffer 54 for binarization has a capacity of 320×240 dots corresponding to partial reading data.

The reading position control memory 100 holds information of the partial reading area with 320×240 dots (hereinafter referred to as "reading area region") of the image with 1280×960 full dots.

Figure 20:
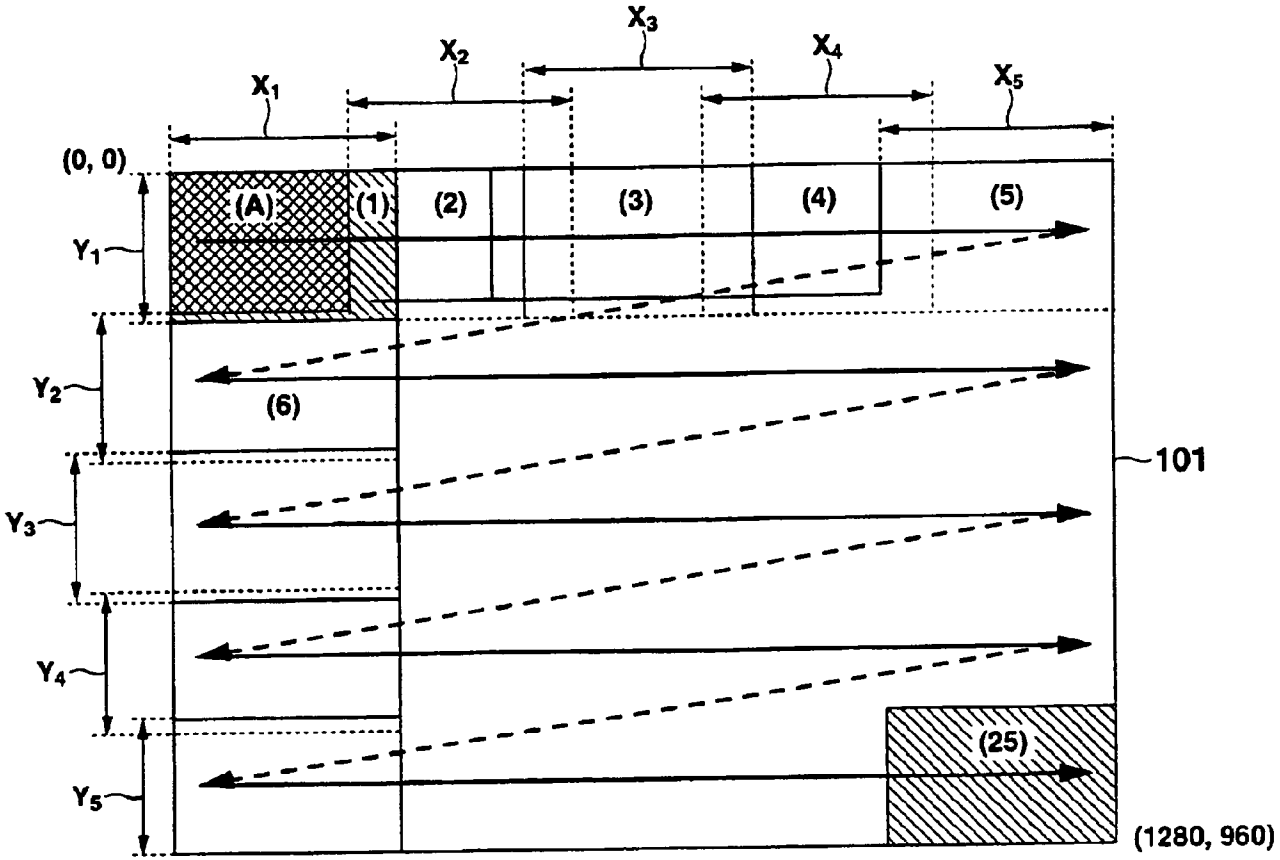
FIG. 20 is a conceptual view of a range of reading areas, and a view showing a boundary line between reading areas when the reading areas are not overlapped with each other.

FIG. 20 is a conceptual view of the reading area region. In the figure, $X_1$ to $X_5$ indicate a horizontal size (320 dots) of the reading area region, and $Y_1$ to $Y_5$ indicate a vertical size (240 dots) of the reading area region. Parenthesized numbers (1) to (25) are numbers of reading area ranges. Searching is performed in order of (1)→(2)→(3)→(4)→(5) →(6)→ . . . →(25), and when searching reaches the last reading area range (25), the operation returns to (1) and searching is repeated. Additionally, heavy-line arrows and dashed arrows indicate searching directions.

Additionally, in the example illustrated, each reading area is overlapped with the adjacent area. Namely, if an image with 1280×960 full dots is equally divided vertically and horizontally (e.g., five equal portions), the size of each reading area range 256×192 dots as in area region A, but the reading area range (1) is 320×240 dots.

In other words, even if there is a spot on a boundary line between the area ranges, an overlap (overlapping area) with 64×48 dots is formed to make it possible to detect a luminance variation at the spot.

An explanation is next given of the operations of the second embodiment.

Figure 21:
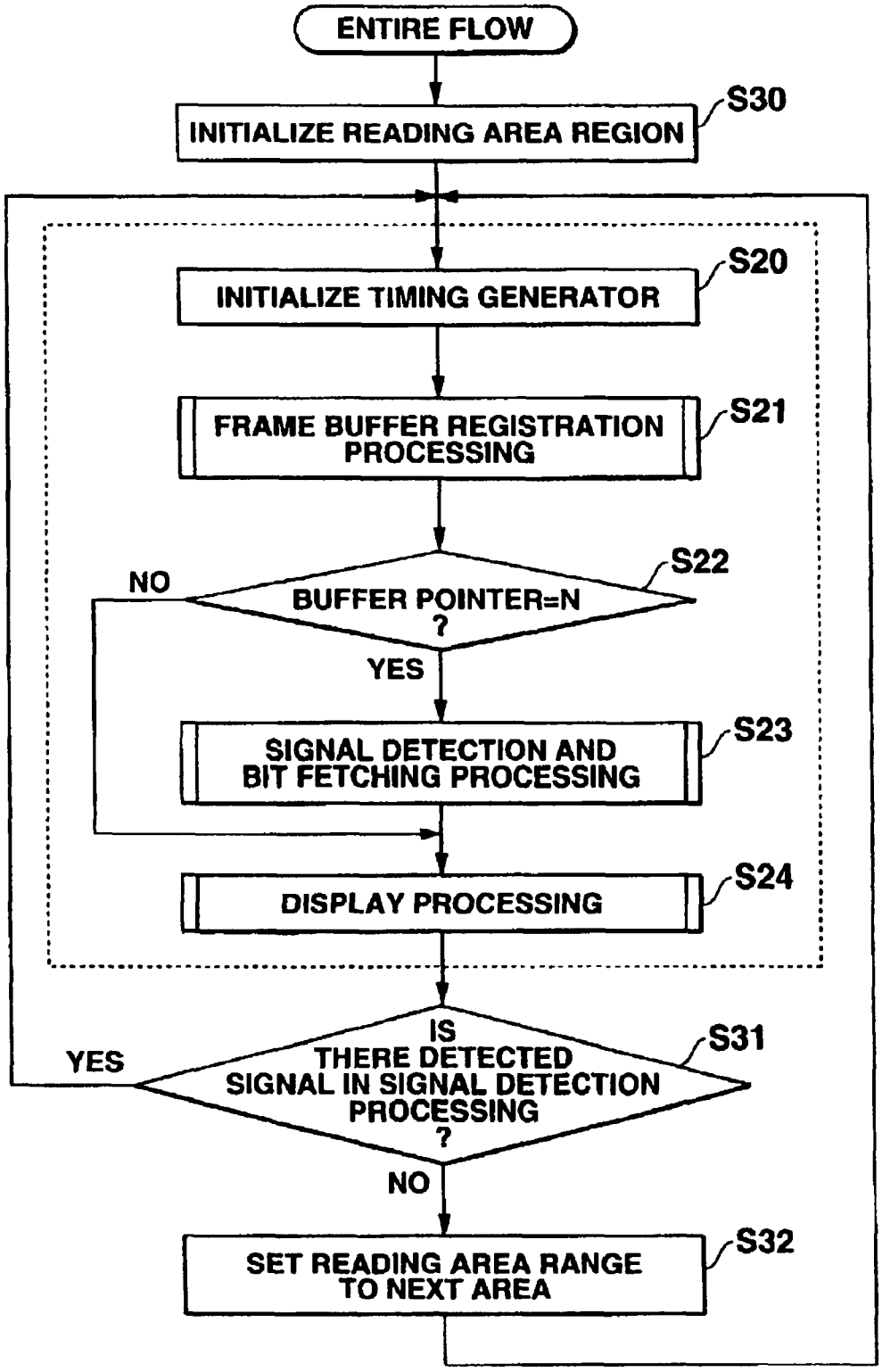
FIG. 21 is a view showing a flowchart of an entire operation of the light receiving unit 40 according to the second embodiment.

FIG. 21 is a view showing a flowchart of an entire operation of the light receiving unit according to the second embodiment.

In this flow, an area with 1280×960 dots at the field angle of image pickup device is divided into several reading area ranges, and processing (steps S20 to S24) shown in the flowchart of FIG. 10 of the first embodiment is repeatedly executed for each reading area.

Namely, the reading area ranges are initialized (step S30), and the first reading area region (reading area range (1) of FIG. 20) is subjected to processing (steps S20 to S24) shown in FIG. 10 of the first embodiment.

In the case where no signal detection is performed in step S23, the determination result of step S31 is "NO", and the operation proceeds to processing for the next read area range (step S32) and processing in step S20 and afterward is repeated-performed on the reading area region. While, in the case where signal detection such as detection of 5-bit code is performed, partial reading processing is performed on the reading area range five times.

Figure 22:
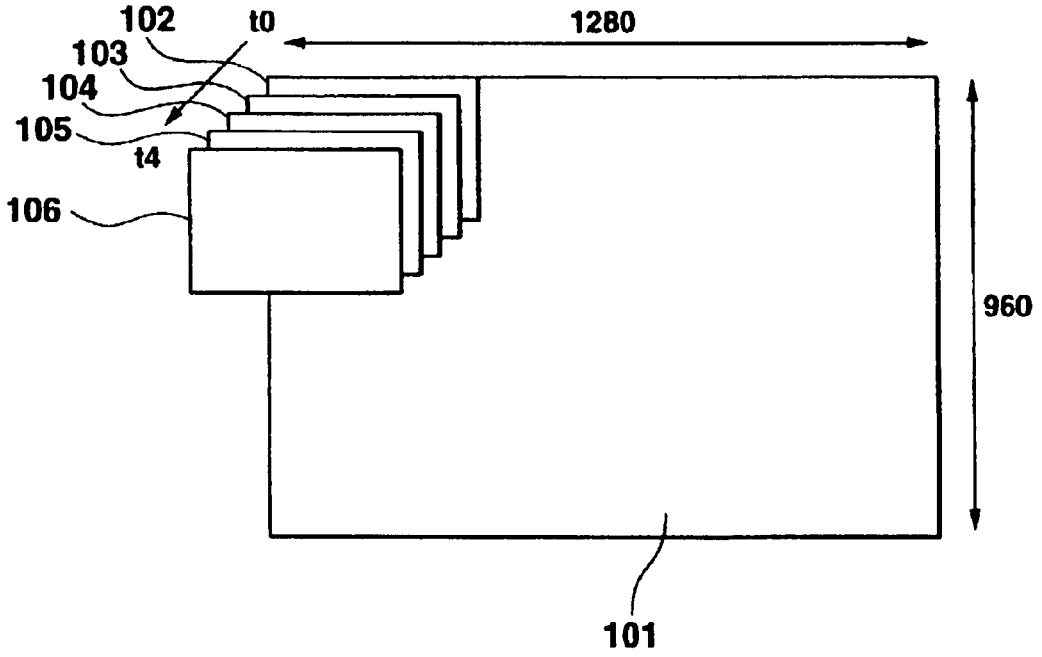
FIG. 22 is a conceptual view showing the corresponding relationship between an original image (image with 1280×960 dots) and the range of reading area (320×240 dots)

FIG. 22 is a conceptual view showing the corresponding relationship between an original image (image with 1280×960 dots) and the range of reading area (320×240 dots).

In this figure, reference numeral 101 indicates an area with 1280×960 dots obtained by the image pickup device, and reference numeral 102 indicates a first reading area range. In this figure, for example, if a 5-bit code is detected, partial reading is performed on one area five times, so that the reading area range 102 is read five times in total at time $t_0$ through $t_4$. In addition, reference numeral 103 indicates a reading area range at time $t_1$ and reference numeral 104 indicates a reading area range at time $t_2$. Reference numeral 105 indicates a reading area range at time $t_3$ and reference numeral 106 indicates a reading area range at time $t_4$.

In this way, according to the second embodiment, the obtained image with 1280×960 dots is divided into reading area ranges each having 320×240 dots. Then, processing (steps S20 to S24) shown in FIG. 10 of the first embodiment is repeated while scanning each area. In the case where the spot with the luminance variation, that is, n-bit code is detected in the divided area, partial reading is performed on the reading area range n times. For this reason, it is possible to grasp the luminance variation in the small area without fail and to increase the amount of data transfer of character information.

In addition, this satisfies the requirement of reducing the amount of data processing at the same time.

Additionally, in the second embodiment, each reading area range is set to 320×240 dots. However, the present invention is not limited to this. Namely, if the area is divided into smaller area ranges, higher frame rate of, e.g., several thousands fps can be achieved. Also, the size of the reading area region is variable and is adaptable to a wider range of code modulation condition by one apparatus.

(Third Embodiment)

In the third embodiment, attention is paid to the point that the image pickup device using CMOS sensor as an image element includes a "sampling mode" function, and the vertical and horizontal lines are sampled every one dot in the same field angle to increase the frame rate.

"Sub-sampling (or sub-sampling compression method)" in the "sampling mode" function is one type of irreversible image compression algorithms. In other words, this is the method that reduces dots with suitable intervals to provide processing to the pixels instead of the method that provides processing to all pixels in the field angle.

Figure 23:
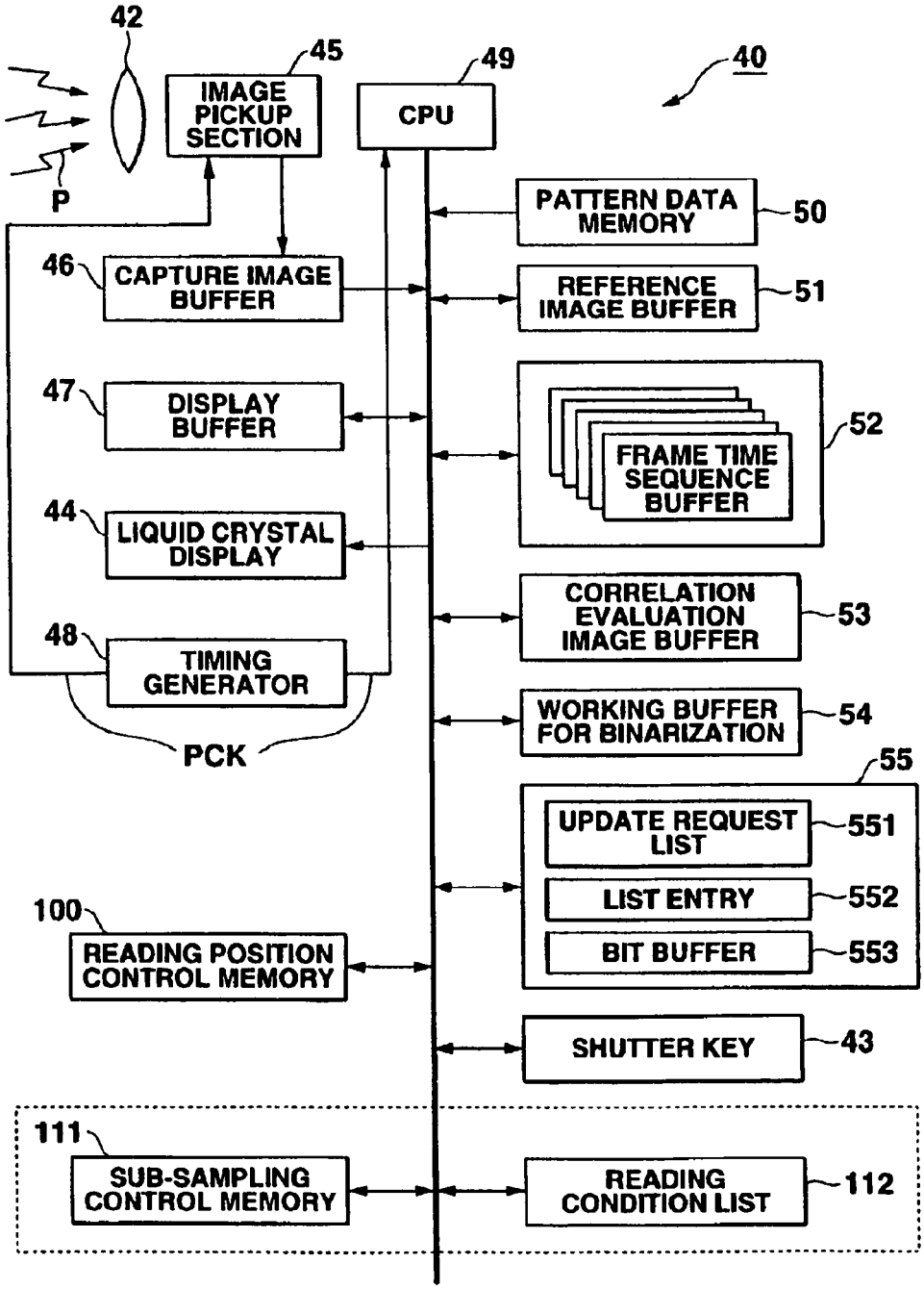
FIG. 23 is a structural view of an electrical interior of the light receiving unit 40 according to a third embodiment.
Figure 25A:
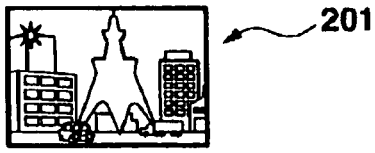
FIGS. 25A-25E are views showing scanned images corresponding to condition numbers (No. 1. to No. 5) stored in the reading condition list memory 112.
Figure 25B:
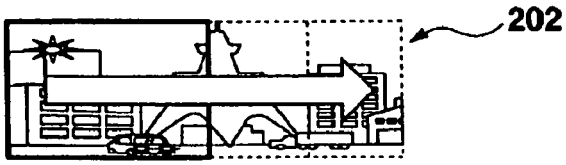
Figure 25C:
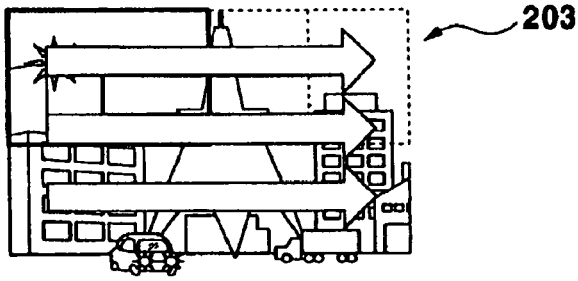
Figure 25D:
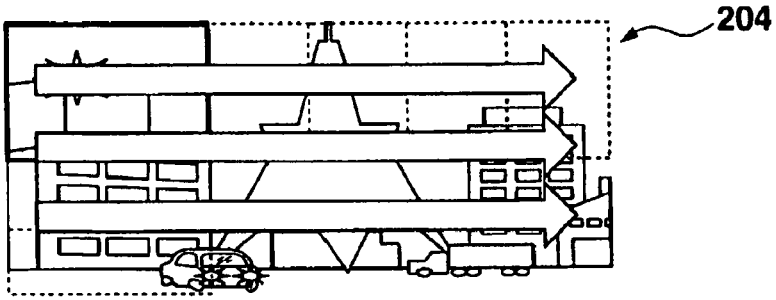
Figure 25E:
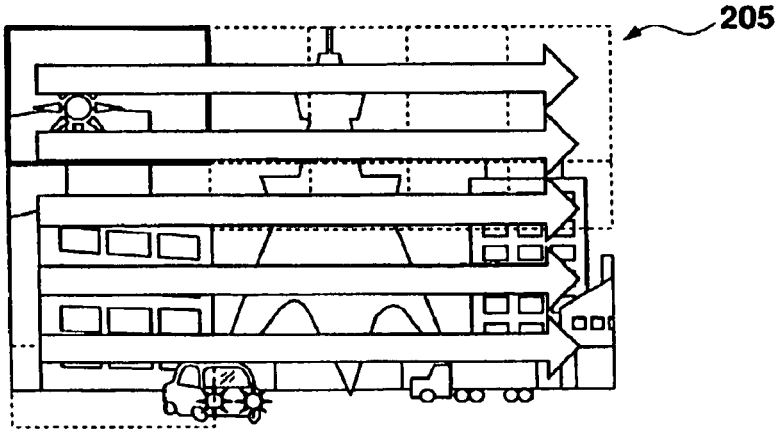

FIG. 23 is a structural view of an electrical interior of the light receiving unit 40 according to a third embodiment.

In order to make full use of the above "sub-sampling mode" function, the third embodiment includes a sub-sampling control memory 111, which holds control information on the "sub-sampling mode" function, and a reading condition list memory 112 as new structural components. The CPU controls the sub-sampling control memory 111 with reference to a reading condition list memory 112.

FIG. 24 is a conceptual view showing storage data stored in the reading condition list memory 112. "No." is a condition number. A pixel reduction condition in the horizontal direction and vertical direction, an image size obtained under the pixel reduction condition and the number of divisions of the original image (the number of regions) are pre-designated for each No. For example, "4" (horizontal and vertical: every 4 dots) is designated in No. 1 as the number of pixel reductions in the horizontal and vertical directions.

For example, in the case where the condition number No. 1 is applied to the original full-dotted image (1280×960 dots), sub-sampling processing is performed with the number of reductions "4" in both the vertical and horizontal directions, and resultantly, the reading area ranges with 320×240 dots are cut sequentially.

Further, in the case where the condition number No. 2 is applied thereto, sub-sampling processing is performed with the number of reductions "4" (every four dots in the vertical direction) "2" (every two dots in the horizontal direction) and the reading area ranges with 320×240 dots are cut sequentially as a full field angle image size of 640 ×240 dots at a full field angle.

Furthermore, in the case where the condition number No. 3 is applied thereto, sub-sampling processing is performed with the number of reductions "2" in both the vertical and horizontal directions and the reading area ranges with 320×240 dots are cut sequentially as a full field angle image size of 640×480 dots.

Still furthermore, in the case where the condition number No. 4 is applied thereto, sub-sampling processing is performed with the number of reductions "2" (every two dots in the vertical direction) "1" (every one dot in the horizontal direction) and the reading area ranges with 320×240 dots are cut sequentially as a full field angle image size of 1280×480 dots.

Still furthermore, in the case where the condition number No. 5 is applied thereto, sub-sampling processing is performed with the number of reductions "1" in both the vertical and horizontal directions and the reading area ranges with 320×240 dots are cut sequentially as a full field angle image size of 1280×960 dots.

FIG. 25 is a view showing an image with a full field angle image size corresponding to each of condition number No. 1 to No. 5 stored in the reading condition list memory 112 and scanned images, each having 320×240 dots, to be sequentially cut.

25A corresponds to condition No. 1, and a scanning image 201 is one that is obtained by reducing the original full dotted image (1280×960 dots) every vertical 4 dots ×horizontal 4 dots. This is the roughest image but the amount of data processing is the smallest.

Moreover, the number of reading area ranges is one, which is vertical 1×horizontal 1. The image of full field angle image size can be captured at a time. Accordingly, for example, in the case where processing shown in FIG. 21 is performed in the second embodiment, the processing loop including steps S32 to step S20 is provided to the same reading area ranges all the time.

25B corresponds to condition No. 2, and a scanning image 202 is one that is obtained by reducing the original full dotted image (1280×960 dots) every vertical 4 dots ×horizontal 2 dots. Under this condition, the degree of roughness in the vertical direction is the same as the above case 25A, but the state in the horizontal direction is finer than the above case 25A.

Still moreover, the number of reading area ranges is three, which is vertical 3×horizontal 1. Accordingly, for example, in the case where processing shown in FIG. 21 is performed in the second embodiment, the reading positions (x, y) are horizontally looped as in (0, 0), (320, 0), (640, 0).

25C corresponds to condition No. 3, and a scanning image 203 is one that is obtained by reducing the original full dotted image every vertical 2 dots×horizontal 2 dots.

25D corresponds to condition No. 4, and a scanning image 204 is one that is obtained by reducing the original full dotted image every vertical 2 dots×horizontal 1 dot.

25E corresponds to condition No. 5, and a scanning image 205 is one that is obtained by reducing the original full dotted image every vertical 1 dot×horizontal 1 dot. This is the finest image but the amount of data processing is the largest.

Additionally, in 25C, 25D, 25E, since the plurality of reading area ranges is set vertically and horizontally, the second reading area range (x, y) results in 640×960 dots including the position (320, 0) to the position (959, 959) at the loop setting time.

However, since the reduction condition stored in the reading condition memory 112 is set according to each condition number, the reading area range with 320×240 is always obtained, and the reading area regions are processed as being overlapped as described in the second embodiment.

Figure 26:
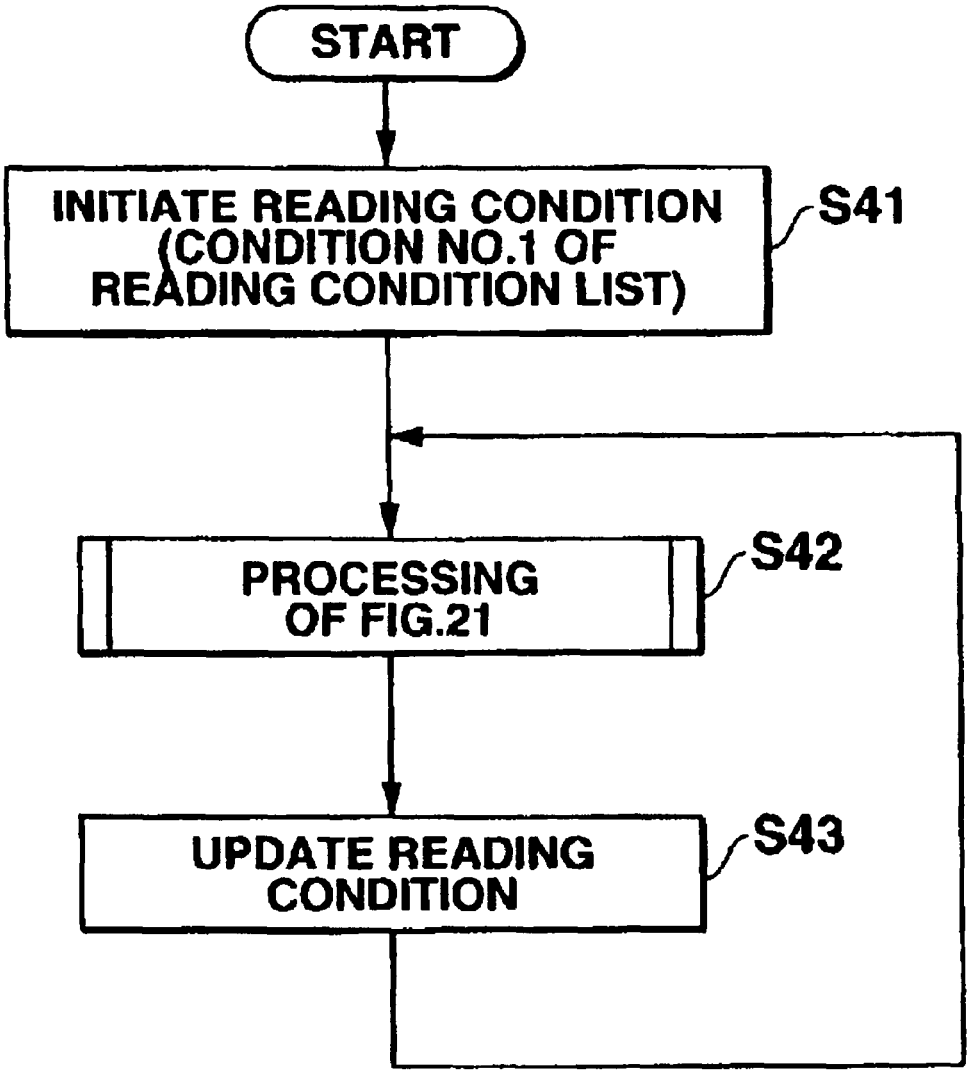
FIG. 26 is a view showing a flowchart of an entire operation of the light receiving unit 40 according to the third embodiment.

FIG. 26 is a view showing a flowchart of an entire operation of the light receiving unit 40 according to the third embodiment.

As shown in FIG. 26, a change in scanning control method is performed on the partial area (reading area range) of the entire image according to each sub-sampling mode explained the second embodiment. Namely, in the case where the signal detection (detection for luminance variation pattern of spot) occurs, processing of step 42 is fixed to perform loop processing.

First, with reference to the condition number No. 1 stored in the reading condition list memory 112 (step S41), an extremely rough search is performed on the entire image at the same rate (step S42; the same processing as shown in FIG. 21).

In this case, according to condition No. 1, for example, in the case of 5-bit pattern, processing for signal detection is performed every time when five images are obtained (in the case of luminance variation in relatively a large range, signal can be detected even if the image is obtained with accuracy of 1/16).

Additionally, display processing in step S42 (display processing in step S24 of FIG. 21) is controlled according to the sampling mode.

In the case where the signal is not detected in the rough searching state (scanning image 201 of FIG. 25), the condition number is updated and the operation proceeds to the similar processing (step S43).

For example, when the condition number is updated from No. 1 to No. 2, the image is made fine horizontally, so that scanning processing to the each area size of the entire image is performed in step S42. When the signal is detected at this stage, the search is ended in the reading area range and binarizing processing of signal is started.

Thus, the condition number is updated to improve definition gradually. Then, a search for smaller signal detection is performed as increasing the amount of scanning to the entire pixel area. When the reading condition list reaches condition No. 5, the operation goes back to the condition No. 1. Namely, the setting of reading condition list is repeated until the luminance variation is detected.

In this way, in the image containing the spot to be detected, even if the field angle is wide, the signal detection can be performed rapidly.

Namely, first, initial acquisition is performed using the rough sample (scanning image 201 of FIG. 25). Then, since definition of sample is improved gradually only when no acquisition is obtained, it is possible to reduce initial acquisition time with scanning processing.

(Fourth Embodiment)

An object of the fourth embodiment is to resist receiving influences of adjacent light beams (fading and noise corresponding to multipath, interference) and to prevent a reduction in transmission rate. The fourth embodiment is characterized by dividing signal detection in the shot image into a detection and acquisition mode where importance is placed on noise resistance and environmental resistance and a decoding mode where decoding is performed after an area/object dot is determined by the detection and acquisition mode, making it possible to perform reliable signal detection and high-speed decoding after signal detection.

In order to achieve the above method, the detection and acquisition mode is performed by low frame rate processing (detection processing using time sequence pattern correlation) to execute signal modulation (light emitting unit 30 side) and signal detection (light receiving unit 40 side). While, the decoding mode is performed by high-rate frame processing to determine a threshold level (threshold value) for signal determination and execute binarization.

Regarding the structural components common to the first embodiment, it is assumed that reference is made to the figures explained in the first embodiment, and structural components newly added are illustrated.

The difference between the fourth embodiment and first embodiment is that the rate at which data is transmitted is high and that there is no update of a monitor for entire image in the fourth embodiment.

Figure 27:
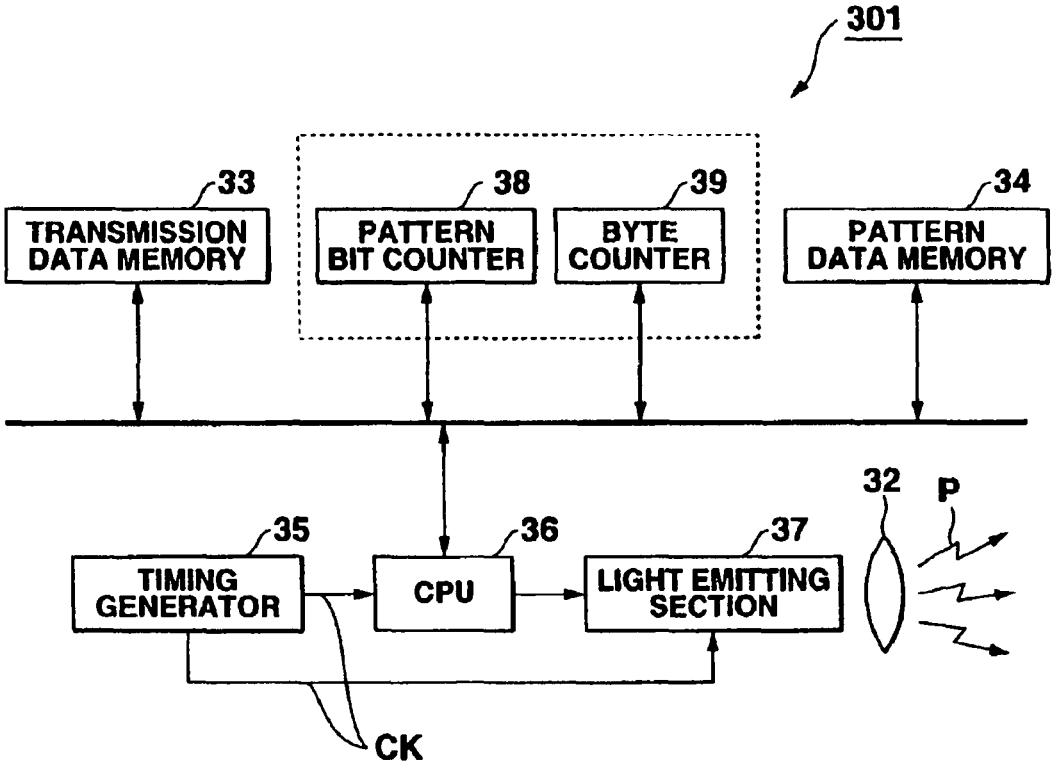
FIG. 27 is a structural view of an electrical interior of a light emitting unit 301 according to a fourth embodiment.

FIG. 27 is a structural view of an electrical interior of a light emitting unit 301 according to a fourth embodiment, and the explanation of the structural components overlapping with the first embodiment 1 is omitted. The structural components newly added are parts enclosed with a broken line, and correspond to a pattern bit counter 38, and a byte counter 39. Additionally, the operations thereof are described with reference to the flowchart of FIG. 28.

In addition, the light emitting unit 301 can change intensity of ON-state light P to high luminance H (hereinafter referred to as "ON(H) state") and low luminance L (hereinafter referred to as "ON(L) state"). This establishes the relationship of "OFF state"<"ON(L) state"<"ON(H) state, seeing from the luminance.

Figure 28:
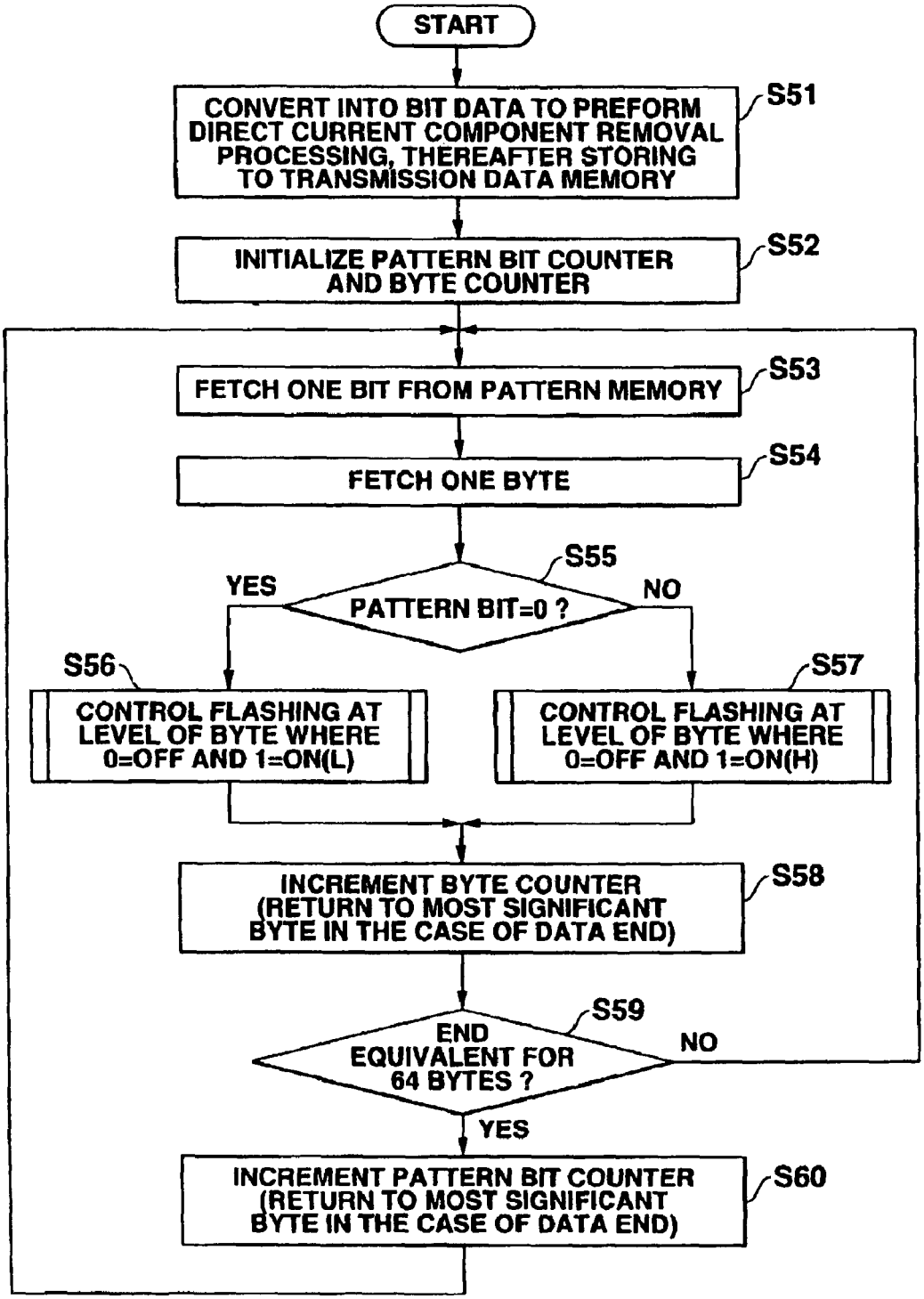
FIG. 28 is an operation flowchart of the light emitting unit 301 according to the fourth embodiment.

FIG. 28 is an operation flowchart of the light emitting unit 301 according to the fourth embodiment.

First, source bit composed of an information character string to be output is converted into bit data, and a direct current component is removed therefrom, and the resultant is stored into the transmission data memory 33 (step S51). Next, the pattern bit counter 38 and byte counter 39 are initialized (step S52). Thereafter, one bit is fetched from the pattern data memory 34 (step S53) and bit data corresponding to one byte is fetched from the transmission data memory 33 (step S54). It is determined whether or not the pattern bit is "0" (logic signal 0) (step S55).

Then, if the pattern bit is logic signal 0, modulation condition of ""0"=OFF state, "1"=ON(L) state" is applied to the corresponding one byte (step S56). While, if the pattern bit is not logic signal 0, modulation condition of ""0"=OFF state, "1"=ON(H) state" is applied to the corresponding one byte (step S57).

Next, the byte counter 39 is incremented (however, when the resultant is data end, data is back to the most significant byte) (step S58). Operations including step S53 and the afterward are repeated until the completion of processing corresponding to 64 bytes is determined (step S59).

While, when the completion of processing corresponding to 64 bytes is determined, the pattern bit counter 38 is incremented (however, when the resultant is data end, data is back to the most significant byte) (step S60). Operations including step S53 and the afterward are repeated.

Additionally, in steps S58 to S60, cyclic control is performed and the signal to be output varies according to one upper pattern bits where transmission data is 64 bits (8 bytes).

Figures 29A, 29B, 29C, 29D:
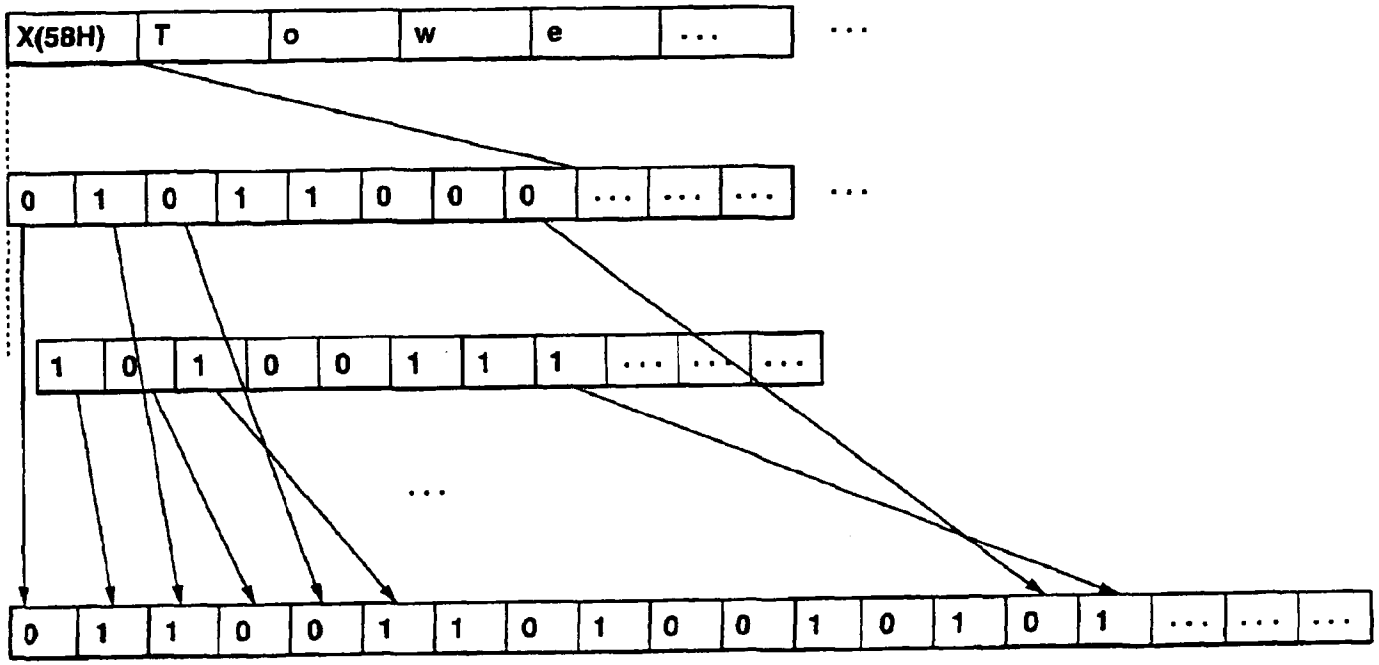
FIGS. 29A-29D are explanatory views of a current component removal of a bit bias (current component) of "1" and "0" are removed from a bit sequence of arbitrary data.

FIG. 29 is an explanatory view relating to the removal of a current component, which is a bias of "1" "0" bits in a bit sequence of source data having an information character string to be output.

The removal of current component is also referred to "equalization of 0/1 dispersion." This is performed to maintain an integral level constant within a given period of time without being influenced by the property of source data in the case where the light-receiving unit 40 to be described later picks up an image at a low frame rate.

First of all, if an information character string 29A to be transmitted is set to "XTower . . . ", a binary sequence 29B, "01011000", is generated as shown in the figure since the top character "X" is "58H" in ASCII code. Next, a bit sequence 29C, "10100111", which is the negative bit sequence of binary sequence 29B , "01011000", is generated. Then, both are mixed in the order of the binary sequence 29B and bit sequence 29C.

Afterward, other characters are processed in the similar manner to generate transmission data to which equalization of 0/1 dispersion is provided.

Additionally, in FIG. 29, the removal of current component has been performed by the mixture with the simple negative bit sequence. However, various kinds of bit sequence conversions with low redundancy can be considered to control continuity 0 or 1. For example, EFM modulation used in a recording sequence, which is called pit of CD (compact disc), and other methods are used.

Figures 30A, 30B, 30C:
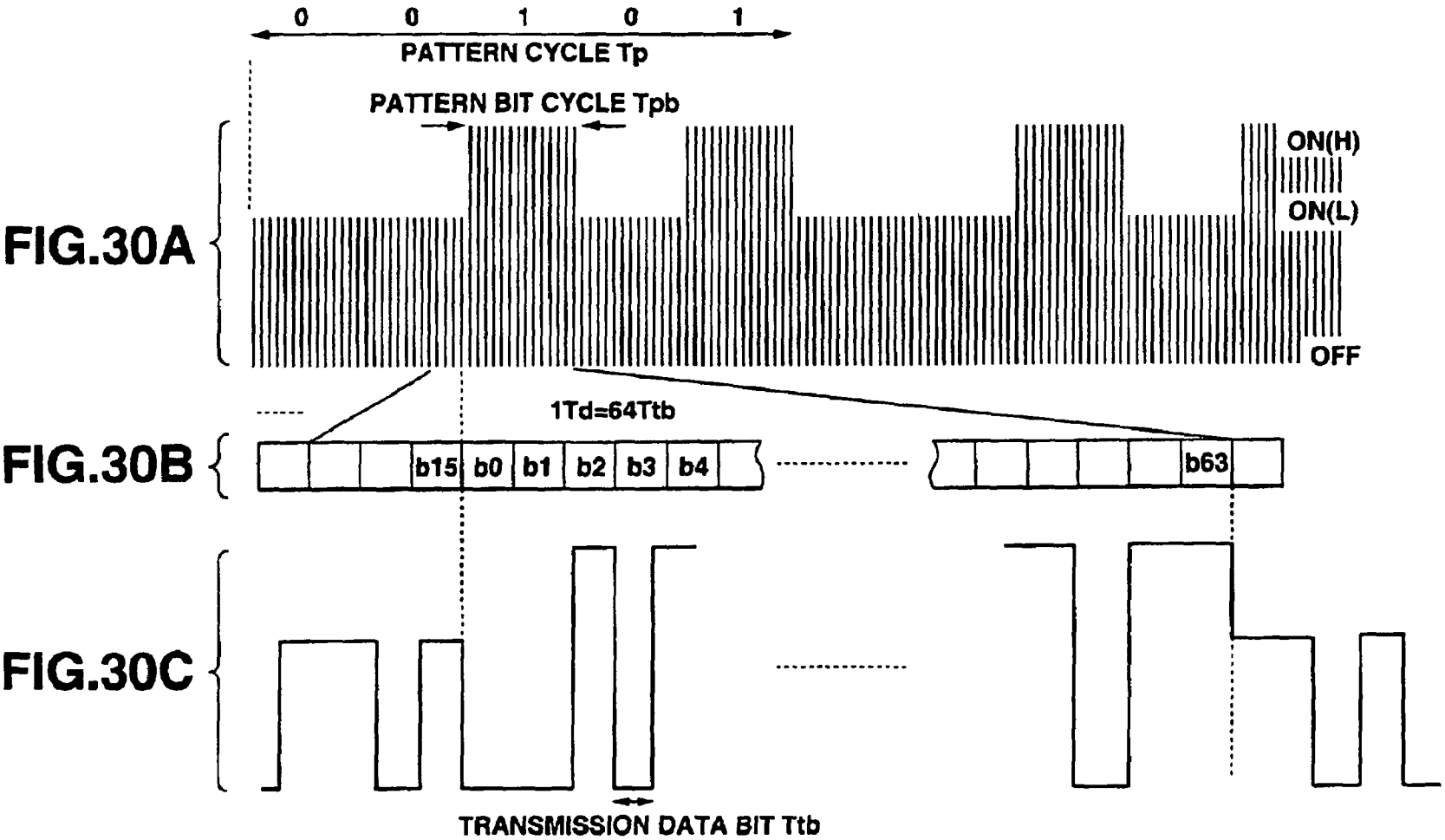
FIGS. 30A-30C are views showing a luminance variation pattern.

FIG. 30 is a view showing a luminance variation pattern in the light emitting unit 301.

In this figure, a spread code pattern is set to "00101", and each bit of this spread code pattern is used as a pattern bit.

In the same figure, the upper stage 30A indicates a luminance variation pattern, seeing from the long cycle. As a whole (as an envelope of luminance variation signal), the luminance changes in accordance with the spread code pattern and varies ON(H), ON(L) for an extremely short period of time.

The middle stage 30B indicates one pattern bit cycle where transmission data is 64 bits, and lower stage 30C indicates a luminance variation pattern, seeing from the short cycle.

According to this figure, if 30A is observed for a long image pickup cycle and shutter time by the light receiving unit 40, it is possible to grasp the luminance variation by the spread code pattern serving as an envelop of 30A to which a lowpass filter is applied. (Hereinafter, such a signal detection method is referred to as "detection and acquisition mode")

Conversely, if 30A is observed for a short image pickup cycle and shutter time by the light receiving unit 40, it is possible to grasp the luminance variation of the original signal level as represented by 30C. (Hereinafter, such a signal detection method is referred to as "decoding mode")

Figure 31:
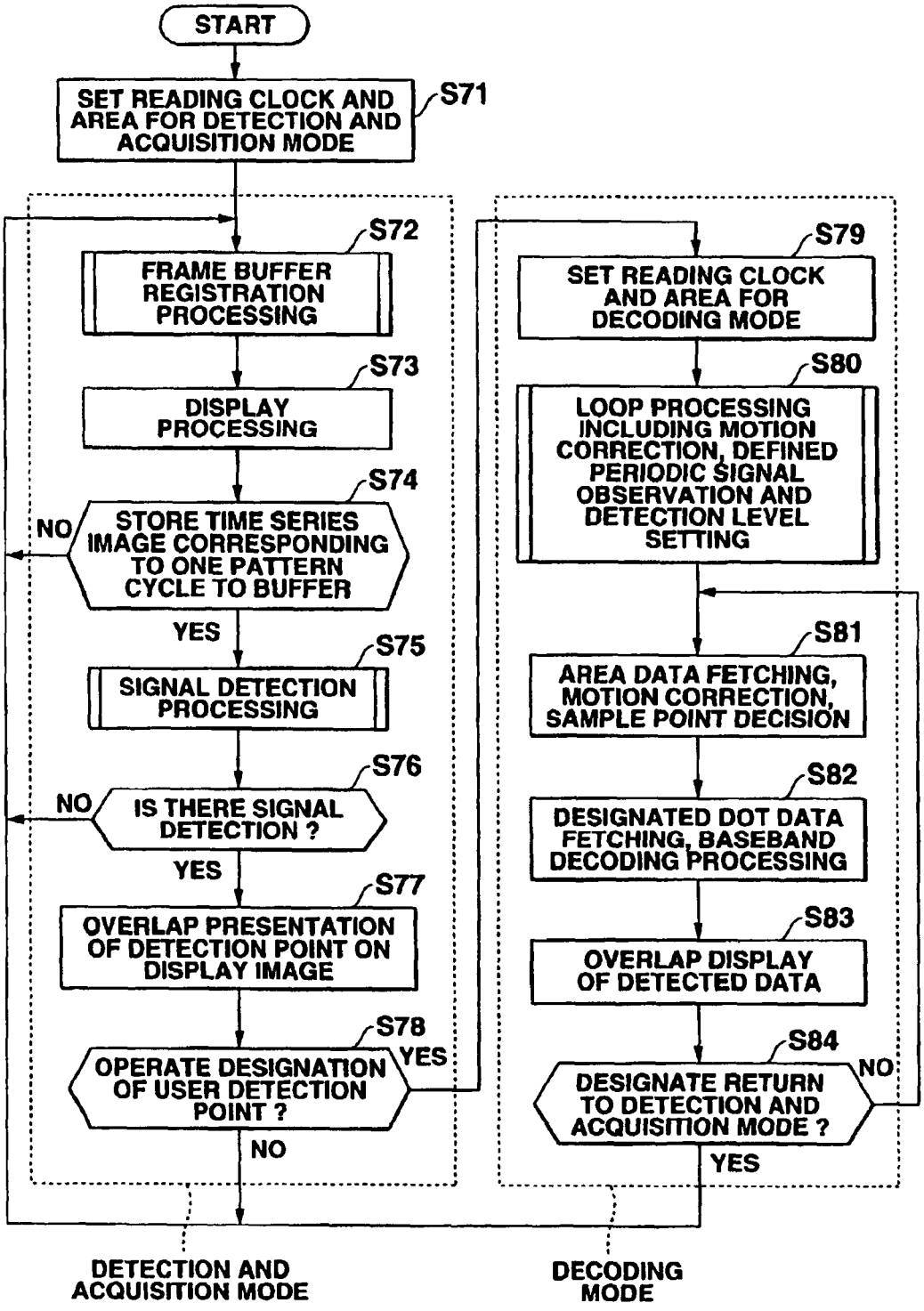
FIG. 31 is a view showing a flowchart of an entire operation of the light receiving unit 40 according to the fourth embodiment.

FIG. 31 is a view showing a flowchart of an entire operation of the light receiving unit 40 according to the fourth embodiment. This flowchart can be divided into "detection and acquisition mode" (steps S72 to S78) and "decoding mode" (steps S79 to S84).

The "detection and acquisition mode" performs a robust signal detection that is not affected by disturbance light of various types even in the case of a feeble luminance variation, and performs baseband decoding processing on the designated area when the signal is detected.

While, the "decoding mode" performs high-rate data decoding after a target area is determined.

In this flow, first, various kinds of setting for performing the signal detection are performed (step S71). In the fourth embodiment, it is assumed that the frame rate at which the entire image is fetched is set to 10 fps.

Figures 32A, 32B:
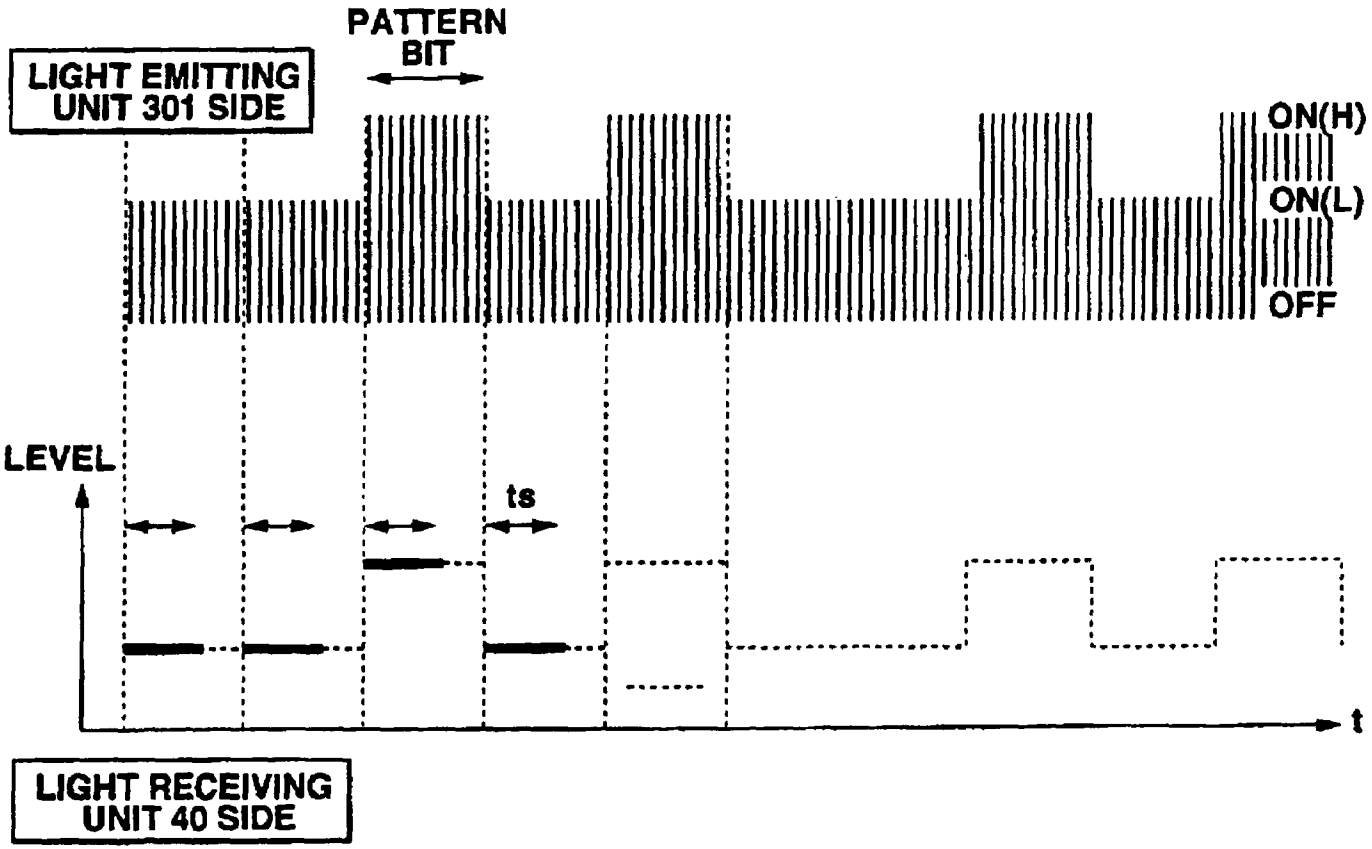
FIGS. 32A and 32B show a timing chart when a low frame rate is set.

FIG. 32 is a timing chart in a detection/acquisition mode. 32A indicates luminance variations in light P output from the light emitting unit 301, and 32B indicates sampling levels obtained when the light receiving unit 40 performs light receiving (image pickup). In the figure, ts denotes shutter time in the signal acquisition mode.

In synchronization with the luminance variations of 32A, the light receiving unit 40 performs light receiving with timing and for shutter time shown by horizontal arrows.

In order to produce a integral effect against the variations in the transmission bit of light emitting unit 301, in the light receiving unit 40, the shutter time is set to be longer, and the aperture and gain are set for picking up an image.

In the case where ts is set to, for example, 50(ms), OFF-ON(L) corresponding to 32bits, are observed and integrated by the light receiving unit 40, so that an average luminance value in signal variations is calculated.

Thus, in the detection and acquisition mode, variations in coordinates where the corresponding signal exists in the field angle are resultantly observed as variations as shown in dot lines.

Figures 33A, 33B:
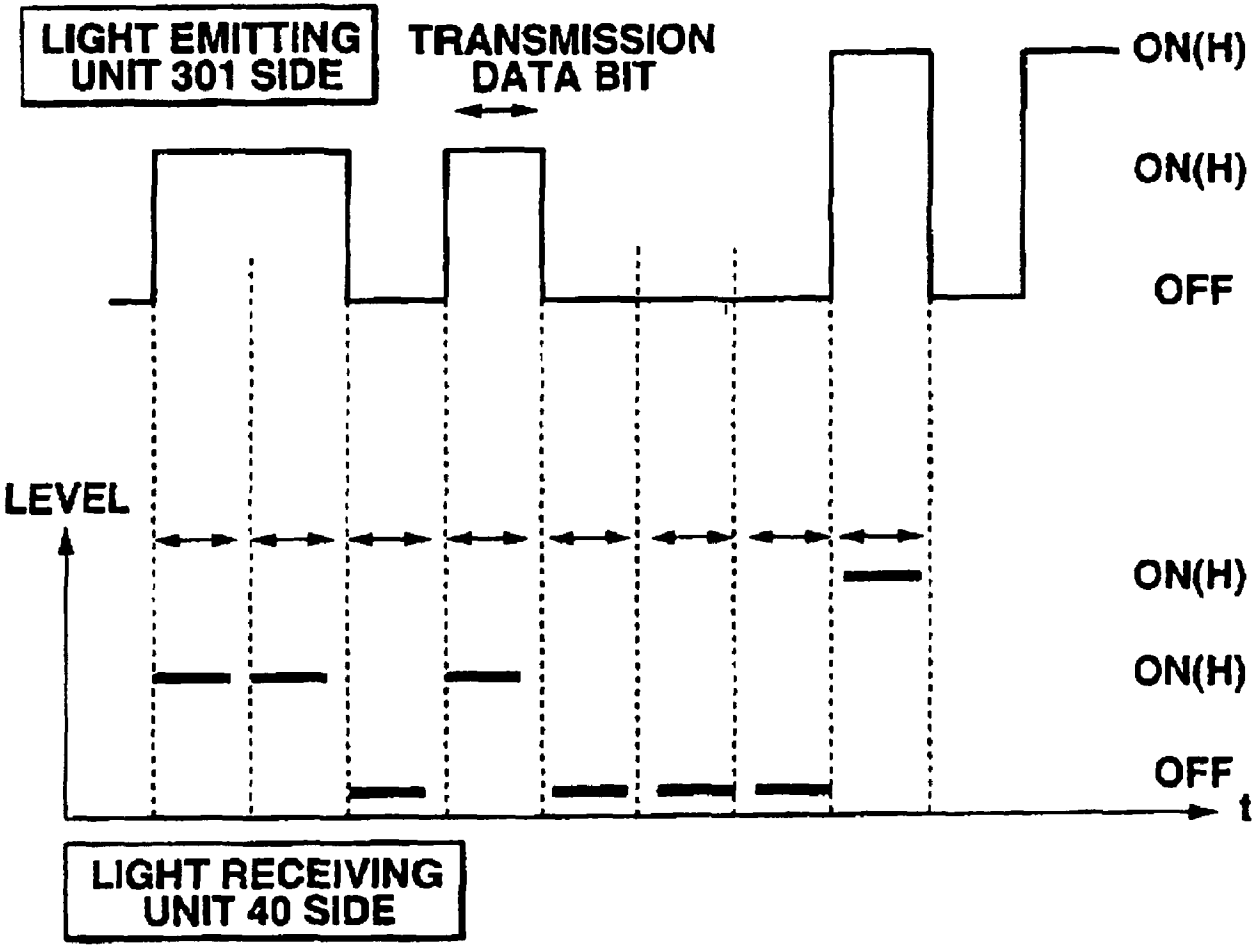
FIGS. 33A and 33B show a timing chart when a high frame rate is set.

FIG. 33 is a timing chart at a decoding mode time. 33A indicates luminance variations in light P output from the light emitting unit 301, and 33B indicates sampling levels obtained when the light receiving unit 40 per-forms light receiving (image pickup). In the figure, ts denotes shutter time in the signal acquisition mode.

In synchronization with the luminance variations of transmission data bit waveform on the light emitting unit 301, the light receiving unit 40 performs light receiving.

In FIG. 31, when reading clock setting for detection and acquisition and reading area range setting are ended as an initial setting (step S71), the same frame buffer registration processing as that of step S21 is performed (step S72) and the same display processing as that of step S24 is performed (step S73). Next, it is determined whether or not a time sequence image corresponding to one pattern cycle is stored in the frame time sequence buffer 52 (whether or not buffer point-N) (step S74). If the determination result is "NO", the processing goes back to step S72. If the determination result is "YES", signal detection processing, that is, luminance variation detection processing using light P is executed (step S75). Then, the presence or absence of signal detection is determined (step S75). In the case of absence, processing goes back to step S72. In the case of presence, a detection mark frame is overlapped and displayed (step S77). Thereafter, if a tap operation to the detection mark frame area is detected (step S78), processing proceeds to decoding mode processing (steps S79 to S84).

In the decoding mode processing, first, a luminance variation detection area and a frame rate are set (step S79). In the fourth embedment, the frame rate is set to 65 times as fast as that of the rate, which is used when an image is picked up at a full field angle.

Step S80 is loop processing in which motion correction is performed on the area corresponding to 16 transmission bits, and the level of central dot is observed. Next, a threshold level is determined to proceed to the later steps S81 to S4.

Figure 34:
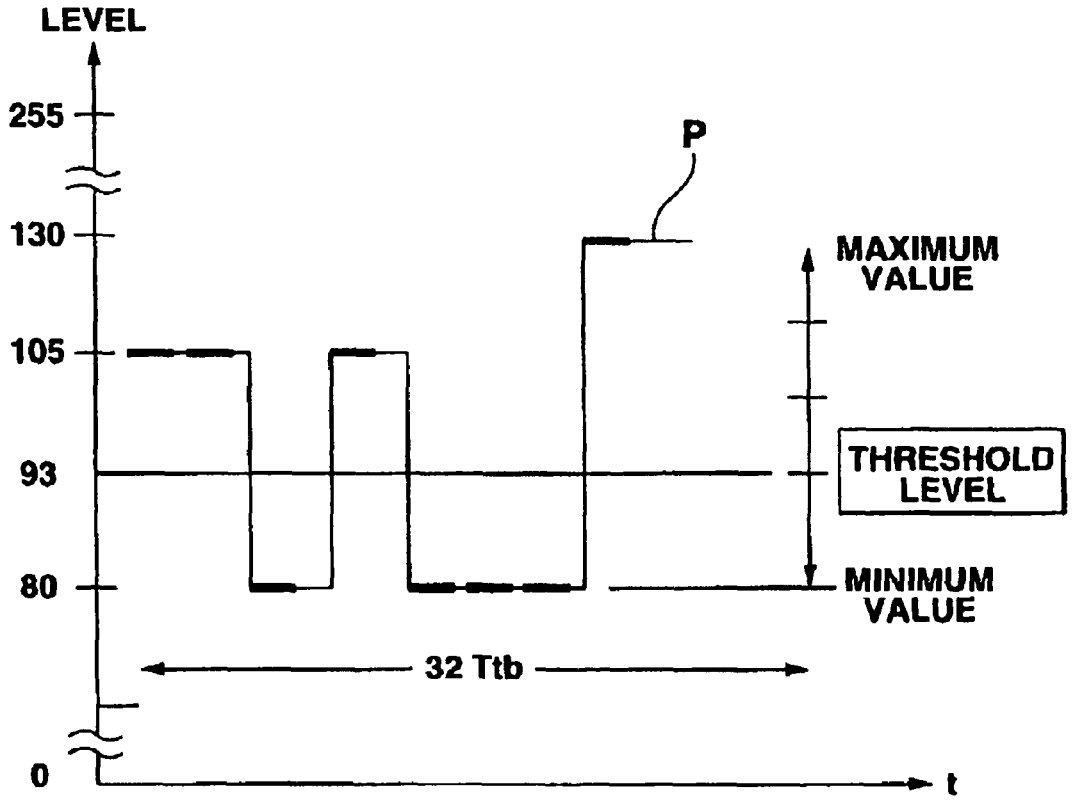
FIG. 34 is a conceptual view of which a threshold level is determined.

FIG. 34 is a conceptual view of which a threshold level is determined.

This figure shows time luminance variations in the decoding mode, and a vertical-axial level is shown by a dynamic range with 256 levels in a 8-bit quantization model. If a waveform D is detected as a baseband waveform in an intermediate area between levels 80 to 105, the threshold level is set as follows:

(130(maximum value)−80(minimum value))/4+80 (minimum value level)=92.5.

Data of the reading area range is fetched based on the threshold level thus determined. The fetched data is compared with the previous data to perform motion correction processing, so that sample dot coordinates to be detected are determined (step S81). Then, the resultant data is subjected to logic determination at the threshold level determined in step S80 to fetch the source data bit sequence one bit by one and to perform decoding processing (step S82)

Figure 35:
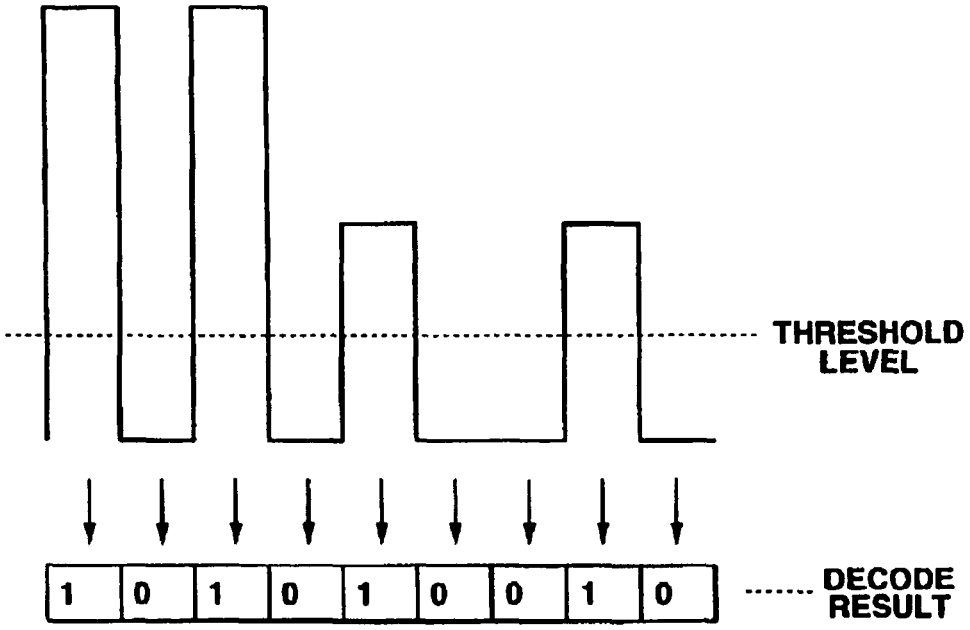
FIG. 35 is a conceptual view of a logical determination.

FIG. 35 is a conceptual view of a logical determination. This shows a case in which the value of less than the threshold level is set to logic signal 0 and the value of equal to or more than the threshold level is set to logic signal 1 to determine a transmission data level based on the determination of threshold level of FIG. 34.

Finally, it is determined whether or not the mode is shifted to a signal detection and acquisition mode after escaping a decoded data display mode in response to the user's operations (specific key operation, etc.) (step S84), and a series of processing is ended.

In this way, according to the fourth embodiment, modulation for detection and modulation for information transmission (baseband modulation) are superimposed on each other and the luminance variations are set to "OFF", "ON (L)", "ON(H)". For this reason, this is a simple and high-rate signal detection method that is strong against disturbance, and this makes it possible to transmit and reproduce a satisfactory image character sequence even if the luminance variation is detected in a small area.

Further, in the detection and acquisition mode, area image data is obtained in advance, and motion correction is performed with correlation between the frames to make it possible to ensure a satisfactory detection performance even if variations such as hand movements occur.

Further, in the detection and acquisition mode, in connection with each area where the user designates the detection area, the operation enters the decoding mode. However, such a configuration that is capable of designating a plurality of areas to be read is provided, making it possible to transfer data to the plurality of areas within time of one frame rate period.

Accordingly, data reading of each area at a given frame rate is performed on a plurality of portions, thereafter entering the decode mode. This makes it possible to configure the apparatus that performs decoding processing on the plurality of areas concurrently.

Moreover, in the fourth embodiment, the baseband modulation is used in the decoding mode. However, a code spread modulation can be used. In this case, it is possible to extremely increase the robustness against variations in detection noise of sensor and image pickup conditions.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-288428 filed on Sep. 21, 2001 and including specification, claims, drawings and summary. The disclosure of the above Japanese Patent Application is incorporated herein by reference in its entirety.

What is claimed is:

1. An information transmission system comprising a light emitting unit that converts arbitrary information into an optical signal to output and a light receiving unit that receives said optical signal to reproduce said information, said light emitting unit including:

determining means for logically determining a bit sequence that structures said arbitrary information;

selecting means for selecting a specific bit pattern sequence from two bit pattern sequences having a low correlation with each other, pre-prepared based on the determination result by said determining means;

modulating means for modulating said arbitrary information to light intensity according to the selection result by said selecting means; and output controlling means for performing control to output the optical signal with intensity modulated by said modulating means;

said light receiving unit including:

binarizing means for receiving the optical signal output from said light emitting unit to binarize according to the light intensity;

bit pattern determining means for determining whether or not the bit pattern sequence included in the signal binarized by said binarizing means corresponds to any one of said pre-prepared two bit pattern sequences having a low correlation with each other;

signal outputting means for outputting a logic signal corresponding to the bit pattern sequence determined by said bit pattern determining means; and reproducing means for reproducing said arbitrary information based on the output result from said signal outputting means.

2. The information transmission system according to claim 1, wherein said modulating means modulates said arbitrary information to light intensity including an OFF state corresponding to non-lighting state, an ON(L) state corresponding to a low luminance lighting state and an ON(H) corresponding to a high luminance lighting state.

3. The information transmission system according to claim 1, wherein said modulating means adds a bit signal such that frequencies of appearance of logic signals different from each other on said light receiving unit side are balanced so as to modulate light intensity in connection with the specific bit sequence selected by said selecting means.

4. The information transmission system according to claim 1, wherein said light receiving unit further includes image pickup means, and output light from said light emitting unit is received by performing image pickup by said image pickup means.

5. The information transmission system according to claim 4, wherein said light receiving unit further includes scanning means for scanning an area subjected to image pickup by said image pickup means, and means for specifying the area of said output light based on the scanning result by said scanning means, said binarizing means binarizes said specified area, and said bit pattern determining means determines whether or not the bit pattern sequence included in the binarized signal corresponds to any one of said pre-prepared two bit pattern sequences having a low correlation with each other.

6. The information transmission system according to claim 5, wherein said light receiving unit further includes dividing means for dividing the area subjected to image pickup by said image pickup means into a plurality of areas, and said scanning means for scanning the respective areas divided by said dividing means, sequentially.

7. The information transmission system according to claim 6, wherein said light receiving unit further includes changing means for changing the size of area to be divided by said dividing means with arbitrary timing.

8. The information transmission system according to claim 6, wherein said light receiving unit further includes sub-sampling means, and area changing means for changing the size of area to be divided by said dividing means by said sub-sampling means.

9. The information transmission system according to claim 5, wherein said light receiving unit further includes means for determining a threshold level of an area scanned by said scanning means, and said binarizing means binarizes the area based on the threshold level determined said means.

10. The information transmission system according to claim 4, wherein said light receiving unit further includes display means for displaying the areas subjected to image pickup by said image pickup means, area selecting means for selecting an area of said output light from among the areas displayed on said display means, and designating means for designating said reproducing means to perform information reproduction on the area of output light selected by said area selecting means.

11. The information transmission system according to claim 10, wherein said light receiving unit further includes display controlling means for causing said display means to display information reproduced by said reproducing means in response to designation from said designating means.

12. An information transmission method that converts information to be transmitted into an optical signal to output by a light emitting unit and that receives said optical signal by a light receiving unit to reproduce said information, said method comprising the steps of:

logically determining a bit sequence that structures information to be transmitted;

selecting a bit pattern sequence alternatively from two bit pattern sequences having a low correlation with each other, pre-prepared according to the result determined in said logic determining step;

outputting the optical signal with intensity modulated according to the result selected in said selecting step;

binarizing the optical signal received according to intensity;

determining whether or not the bit pattern sequence included in the result binarized in said binarizing step corresponds to any one of said pre-prepared two bit pattern sequences having a low correlation with each other;

generating a corresponding logic signal when the bit pattern sequence corresponds to any one of said two bit pattern sequences is determined in said determining step; and reproducing said information based on the logic signal generated in said generating step.

13. The information transmission method according to claim 12, further comprising the steps of:

capturing an output light from said light emitting unit as an image of an area including said output light; and displaying the image captured in said capturing step and reproduced information.

14. An image pickup device comprising:

image pickup means;

storage means for storing two bit pattern sequences having a low correlation with each other;

scanning means for scanning an area subjected to image pickup by said image pickup means;

means for specifying an output light area subjected to intensity modulation based on the result scanned by said scanning means;

binarizing means for binarizing the output light area specified by said means according to light intensity;

bit pattern determining means for determining whether or not the bit pattern sequence included in the signal binarized by said binarizing means corresponds to any one of said two bit pattern sequences having a low correlation with each other, stored in said storage means;

signal outputting means for outputting a logic signal corresponding to the bit pattern sequence determined by said bit pattern determining means; and reproducing means for reproducing information based on the output result from said signal outputting means.

15. The image pickup device according to claim 14, further comprising:

dividing means for dividing the area subjected to image pickup by said image pickup means into a plurality of areas, and said scanning means scanning the respective areas divided by said dividing means, sequentially.

16. The image pickup device according to claim 15, further comprising:

changing means for changing the size of area to be divided by said dividing means with arbitrary timing.

17. The image pickup device according to claim 15, further comprising:

sub-sampling means; and area changing means for changing the size of area to be divided by said dividing means by said sub-sampling means.

18. The image pickup device according to claim 14, further comprising:

display means for displaying the areas subjected to image pickup by said image pickup means;

area selecting means for selecting said output light area from among the areas displayed on said display means; and designating means for designating said information output means to perform information output on the output light area selected by said area selecting means.

19. The image pickup device according to claim 18, further comprising:

display controlling means for causing said display means to display information output by said information output means in response to designation from said designating means.

20. A [computer programmed product having a computer-program recorded on storage computer-readable storage medium, said computer-program causing] *non-transitory computer readable storage medium having a computer program stored thereon that is executable by* a computer[, being] connected to an image pickup device[,] to execute steps [of] *including*:

scanning an area subjected to image pickup by said image pickup device;

specifying an output light area subjected to intensity modulation based on said scanned result;

binarizing said specified output light area according to light intensity;

determining whether or not a bit pattern sequence included in the signal binarized by said binarizing means corresponds to any one of pre-prepared two bit pattern sequences having a low correlation with each other;

outputting a logic signal corresponding to said determined bit pattern sequence; and outputting information based on said output result in said signal outputting step.

* * * * *

UNITED STATES PATENT AND TRADEMARK OFFICE

CERTIFICATE OF CORRECTION

PATENT NO. : RE42,848 E
APPLICATION NO. : 11/895260
DATED : October 18, 2011
INVENTOR(S) : Sato et al.

It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*